United States Patent
Karczewicz et al.

(10) Patent No.: US 10,595,035 B2
(45) Date of Patent: Mar. 17, 2020

(54) CONSTRAINING MOTION VECTOR INFORMATION DERIVED BY DECODER-SIDE MOTION VECTOR DERIVATION

(71) Applicant: QUALCOMM Incorporated, San Diego, CA (US)

(72) Inventors: Marta Karczewicz, San Diego, CA (US); Yi-Wen Chen, San Diego, CA (US); Wei-Jung Chien, San Diego, CA (US); Hsiao-Chiang Chuang, San Diego, CA (US); Xiang Li, San Diego, CA (US); Jianle Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 15/927,854

(22) Filed: Mar. 21, 2018

(65) Prior Publication Data

US 2018/0278949 A1  Sep. 27, 2018

Related U.S. Application Data

(60) Provisional application No. 62/475,177, filed on Mar. 22, 2017.

(51) Int. Cl.
*H04N 19/44* (2014.01)
*H04N 19/513* (2014.01)
*H04N 19/587* (2014.01)
*H04N 19/577* (2014.01)

(52) U.S. Cl.
CPC ........... *H04N 19/513* (2014.11); *H04N 19/44* (2014.11); *H04N 19/577* (2014.11); *H04N 19/587* (2014.11)

(58) Field of Classification Search
CPC ....... H04N 19/57; H04N 19/44; H04N 19/513
See application file for complete search history.

(56) References Cited

U.S. PATENT DOCUMENTS

2013/0003851 A1\* 1/2013 Yu .................. H04N 19/105
  375/240.16
2018/0249154 A1\* 8/2018 Chuang .................. H04N 19/52

FOREIGN PATENT DOCUMENTS

WO    2013006386 A1    1/2013

OTHER PUBLICATIONS

International Search Report and Written Opinion—PCT/US2018/023761—ISA/EPO—dated Jul. 3, 2018, 16 pages.

(Continued)

*Primary Examiner* — Tsion B Owens
(74) *Attorney, Agent, or Firm* — Shumaker & Sieffert, P.A.

(57) ABSTRACT

Techniques related to decoder-side motion vector derivation (DMVD) are described. For example, this disclosure describes techniques related to applying one or more constraints to motion information, such as a motion vector (MV) derived by DMVD, and/or a MV difference between an initial MV and an MV derived by DMVD. When the constraint is applied to the DMVD, in certain examples, only the derived motion information which meets the constraint is regarded as valid motion information. Conditions may be placed on the constraints.

18 Claims, 19 Drawing Sheets

(56) References Cited

OTHER PUBLICATIONS

Samuelsson J., et al., "Motion vector coding optimizations," 3rd JVET Meeting; May 26, 2016-Jan. 6, 2016; Geneva, CH (The Joint Video Exploration Team of ISO/IEC JTC1/SC29/WG11 and ITU-T SG.16 ); URL: http://phenix.int-evry.fr/jvet/, No. JVET-C0068-v3, May 28, 2016 (May 28, 2016), XP030150172, 5 pages.

Zheng Y., et al., "Extended Motion Vector Prediction for Bi Predictive Mode," 96th MPEG Meeting; Mar. 21, 2011-Mar. 25, 2011; Geneva, CH (Motion Picture Expert Group or ISO/IEC JTC1/SC29/WG11), No. m19871, Mar. 19, 2011 (Mar. 19, 2011), XP030048438, 4 pages.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 312 pp.

Chen J., et al., "Algorithm Description of Joint Exploration Test Model 5", Document: JVET-E1001_v2, Joint Video Exploration Team (JVET) of ITU-T SG 16 WP 3 and ISO/IEC JTC 1/SC 29/WG 11, 5th Meeting: Geneva, CH, Jan. 12-20, 2017, 19 Pages.

Yongbing L., et al., "Enhanced Template Matching in FRUC Mode", Document: JVET-E0035, Joint Video Exploration Team (JVET) of ITU-T SG 16 WP 3 and ISO/IEC JTC 1/SC 29/WG 11, 5th Meeting: Geneva, CH, Jan. 12-20, 2017, 4 Pages.

Kaiming H., et al., "Guided image filtering", IEEE Transactions on Pattern Analysis and Machine Intelligence, vol. 35, No. 6, Jun. 2013, pp. 1397-1409.

"Bilateral filter" retrieved from https://en.wikipedia.org/wiki/Bilateral_filter, accessed on Mar. 21, 2018, 4 Pages.

"Sum of absolute transformed differences" Wikipedida, retrieved from https://en.wikipedia.org/wiki/Sum_of_absolute_transformed_differences, accessed on Mar. 21, 2018, 1 Pages.

Sullivan J., et al., "Overview of the High Efficiency Video Coding (HEVC) Standard", IEEE Transactions on Circuits and Systems for Video Technology, vol. 22, No. 12, Dec. 2012, pp. 1649-1668.

\* cited by examiner

CONSTRAINING MOTION VECTOR INFORMATION DERIVED BY DECODER-SIDE MOTION VECTOR DERIVATION

This application claims the benefit of U.S. Provisional Patent Application No. 62/475,177 filed Mar. 22, 2017, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by ITU-T H.261, ISO/IEC MPEG-1 Visual, ITU-T H.262 or ISO/IEC MPEG-2 Visual, ITU-T H.263, ITU-T H.264/MPEG-4, Part 10, Advanced Video Coding (AVC), ITU-T H.265/High Efficiency Video Coding (HEVC), and extensions of such standards, such as Scalable Video Coding (SVC) and Multi-view Video Coding (MVC) extensions. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to decoder-side motion vector derivation (DMVD). For example, this disclosure describes techniques related to applying one or more constraints to motion information, such as a motion vector (MV) derived by DMVD, and/or a MV difference between an initial MV and an MV derived by DMVD. These techniques may be applied to any of the existing video codecs, such as HEVC (High Efficiency Video Coding), and/or may be an efficient coding tool in any future video coding standards. When the constraint is applied to MVs and/or MV differences derived with DMVD, in certain examples, only the derived motion information which meets the constraint is regarded as valid motion information. Thus, the list of MVs and the final selected MV may be different had the constraint not have been used which may increase coding efficiency and/or reduce bit-rate. In some examples the constraint includes whether the derived MVs are symmetric, whether the MV differences between the initial MVs and the MVs derived by DMVD methods are symmetric, whether the derived MVs are anti-symmetric, whether the MV differences between the initial MVs and the MVs derived by DMVD methods are anti-symmetric. In some examples, the enabling of symmetric/anti-symmetric MV/MV differences constraints are explicitly signaled. In other examples, the constraints may be implicitly determined according to some coded information. In further examples, conditions may be placed on the constraints such that the constraint only applies in certain examples.

In an example, a method of decoding video data from an encoded video bitstream, the method comprising generating, using decoder-side motion vector derivation (DMVD), a plurality of derived motion vectors, determining a first derived motion vector and a second derived motion vector from the plurality of derived motion vectors based on a cost metric, comprising: determining that the first derived motion vector and the second derived motion vector satisfy at least one constraint on a relationship between the first derived motion vector and the second derived motion vector, the relationship comprising: the first derived motion vector and the second derived motion vector have a symmetric motion vector difference, the first derived motion vector and the second derived motion vector have a pseudo symmetric motion vector difference, the first derived motion vector and the second derived motion vector are anti-symmetric, the first derived motion vector and the second derived motion vector have an anti-symmetric motion vector difference, or the first derived motion vector and the second derived motion vector have a pseudo anti-symmetric motion vector difference, and decoding a current block using the determined first derived motion vector and the second derived motion vector using bi-prediction.

In another example, a method of encoding video data, the method comprising generating, using decoder-side motion vector derivation (DMVD), a plurality of derived motion vectors, determining a first derived motion vector and a second derived motion vector from the plurality of derived motion vectors based on a cost metric, comprising: determining that the first derived motion vector and the second derived motion vector satisfy at least one constraint on a relationship between the first derived motion vector and the second derived motion vector, the relationship comprising:

the first derived motion vector and the second derived motion vector have a symmetric motion vector difference, the first derived motion vector and the second derived motion vector have a pseudo symmetric motion vector difference, the first derived motion vector and the second derived motion vector are anti-symmetric, the first derived motion vector and the second derived motion vector have an anti-symmetric motion vector difference, or the first derived motion vector and the second derived motion vector have a pseudo anti-symmetric motion vector difference, and encoding a current block using the determined first derived motion vector and the second derived motion vector using bi-prediction.

In another example, an apparatus configured to decode video data from an encoded video bitstream, the apparatus comprising: a memory configured to store the video data, and one or more processors in communication with the memory, the one or more processors configured to: generate, using decoder-side motion vector derivation (DMVD), a plurality of derived motion vectors, determine a first derived motion vector and a second derived motion vector from the plurality of derived motion vectors based on a cost metric, comprising: a determination that the first derived motion vector and the second derived motion vector satisfy at least one constraint on a relationship between the first derived motion vector and the second derived motion vector, the relationship comprising: the first derived motion vector and the second derived motion vector have a symmetric motion vector difference, the first derived motion vector and the second derived motion vector have a pseudo symmetric motion vector difference, the first derived motion vector and the second derived motion vector are anti-symmetric, the first derived motion vector and the second derived motion vector have an anti-symmetric motion vector difference, or the first derived motion vector and the second derived motion vector have a pseudo anti-symmetric motion vector difference, and decode a current block using the determined first derived motion vector and the second derived motion vector using bi-prediction.

In another example, an apparatus configured to encode video data, the apparatus comprising: a memory configured to store the video data, and one or more processors in communication with the memory, the one or more processors configured to: generate, using decoder-side motion vector derivation (DMVD), a plurality of derived motion vectors, determine a first derived motion vector and a second derived motion vector from the plurality of derived motion vectors based on a cost metric, comprising: a determination that the first derived motion vector and the second derived motion vector satisfy at least one constraint on a relationship between the first derived motion vector and the second derived motion vector, the relationship comprising: the first derived motion vector and the second derived motion vector have a symmetric motion vector difference, the first derived motion vector and the second derived motion vector have a pseudo symmetric motion vector difference, the first derived motion vector and the second derived motion vector are anti-symmetric, the first derived motion vector and the second derived motion vector have an anti-symmetric motion vector difference, or the first derived motion vector and the second derived motion vector have a pseudo anti-symmetric motion vector difference, and decode a current block using the determined first derived motion vector and the second derived motion vector using bi-prediction.

In another example, an apparatus configured to decode video data from an encoded video bitstream, the apparatus comprising: means for generating, using decoder-side motion vector derivation (DMVD), a plurality of derived motion vectors, means for determining a first derived motion vector and a second derived motion vector from the plurality of derived motion vectors based on a cost metric, comprising: means for determining that the first derived motion vector and the second derived motion vector satisfy at least one constraint on a relationship between the first derived motion vector and the second derived motion vector, the relationship comprising: the first derived motion vector and the second derived motion vector have a symmetric motion vector difference, the first derived motion vector and the second derived motion vector have a pseudo symmetric motion vector difference, the first derived motion vector and the second derived motion vector are anti-symmetric, the first derived motion vector and the second derived motion vector have an anti-symmetric motion vector difference, or the first derived motion vector and the second derived motion vector have a pseudo anti-symmetric motion vector difference, and means for decoding a current block using the determined first derived motion vector and the second derived motion vector using bi-prediction.

In another example, an apparatus configured to encode video data, the apparatus comprising: means for generating, using decoder-side motion vector derivation (DMVD), a plurality of derived motion vectors, means for determining a first derived motion vector and a second derived motion vector from the plurality of derived motion vectors based on a cost metric, comprising: means for determining that the first derived motion vector and the second derived motion vector satisfy at least one constraint on a relationship between the first derived motion vector and the second derived motion vector, the relationship comprising: the first derived motion vector and the second derived motion vector have a symmetric motion vector difference, the first derived motion vector and the second derived motion vector have a pseudo symmetric motion vector difference, the first derived motion vector and the second derived motion vector are anti-symmetric, the first derived motion vector and the second derived motion vector have an anti-symmetric motion vector difference, or the first derived motion vector and the second derived motion vector have a pseudo anti-symmetric motion vector difference, and means for encoding a current block using the determined first derived motion vector and the second derived motion vector using bi-prediction.

In another example, this disclosure describes a computer-readable storage medium storing instructions that, when executed, cause one or more processors of a device configured to generate, using decoder-side motion vector derivation (DMVD), a plurality of derived motion vectors, determine a first derived motion vector and a second derived motion vector from the plurality of derived motion vectors based on a cost metric, comprising: a determination that the first derived motion vector and the second derived motion vector satisfy at least one constraint on a relationship between the first derived motion vector and the second derived motion vector, the relationship comprising: the first derived motion vector and the second derived motion vector have a symmetric motion vector difference, the first derived motion vector and the second derived motion vector have a pseudo symmetric motion vector difference, the first derived motion vector and the second derived motion vector are anti-symmetric, the first derived motion vector and the second derived motion vector have an anti-symmetric motion vector difference, or the first derived motion vector and the second derived motion vector have a pseudo anti-symmetric motion vector difference, and decode a current block using the determined first derived motion vector and the second derived motion vector using bi-prediction.

In another example, this disclosure describes a computer-readable storage medium storing instructions that, when executed, cause one or more processors of a device configured to generate, using decoder-side motion vector derivation (DMVD), a plurality of derived motion vectors, determine a first derived motion vector and a second derived motion vector from the plurality of derived motion vectors based on a cost metric, comprising: a determination that the first derived motion vector and the second derived motion vector satisfy at least one constraint on a relationship between the first derived motion vector and the second derived motion vector, the relationship comprising: the first derived motion vector and the second derived motion vector have a symmetric motion vector difference, the first derived motion vector and the second derived motion vector have a pseudo symmetric motion vector difference, the first derived motion vector and the second derived motion vector are anti-symmetric, the first derived motion vector and the second derived motion vector have an anti-symmetric motion vector difference, or the first derived motion vector and the second derived motion vector have a pseudo anti-symmetric motion vector difference, and decode a current block using the determined first derived motion vector and the second derived motion vector using bi-prediction.

The details of one or more examples are set forth in the accompanying drawings and the description below. Other features, objects, and advantages will be apparent from the description and drawings, and from the claims.

DETAILED DESCRIPTION

Figure 1:
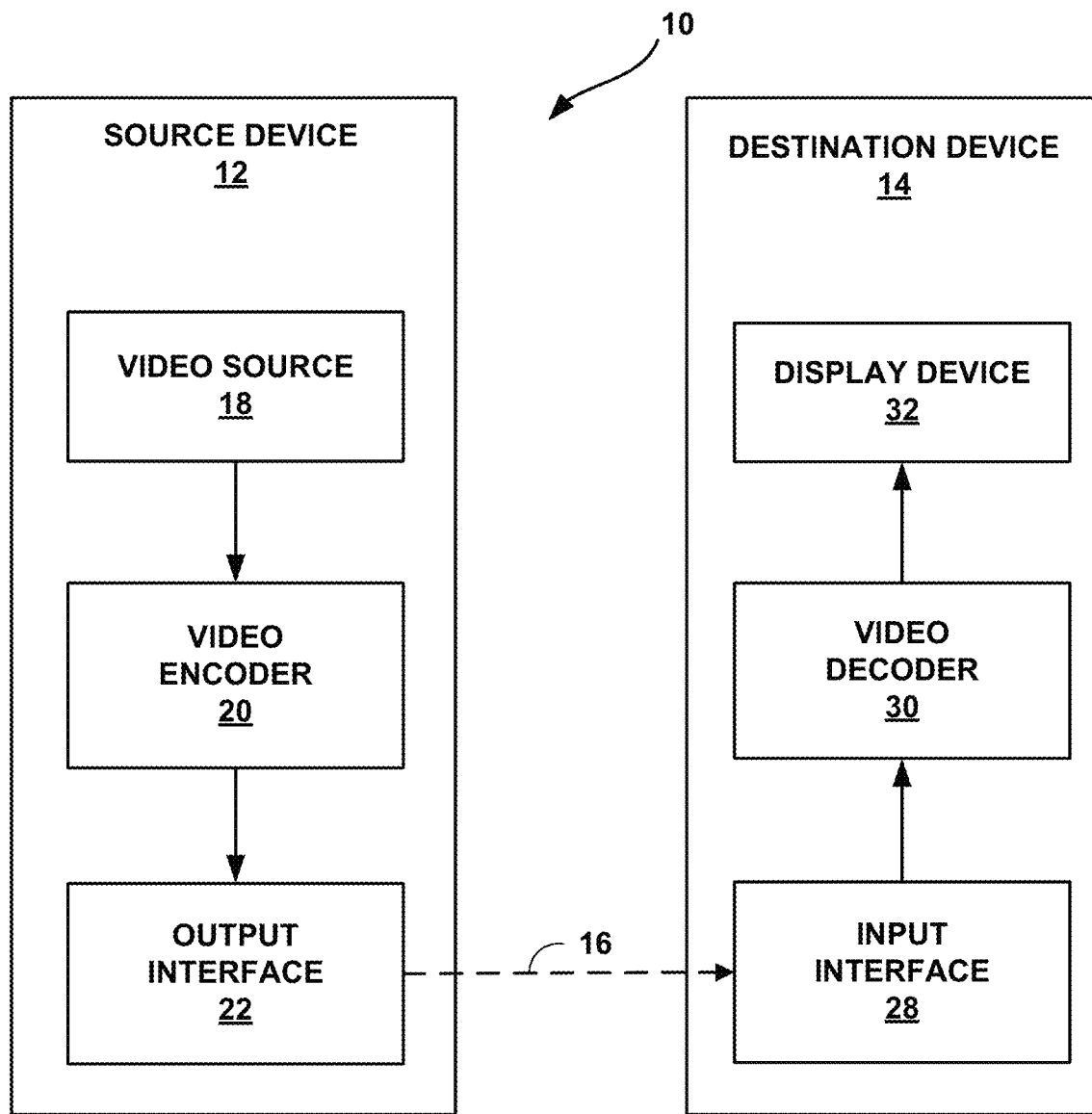
FIG. 1 is a block diagram illustrating an example video encoding and decoding system that may utilize techniques for performing decoder-side motion vector derivation (DMVD) of this disclosure.

This disclosure describes techniques related to decoder-side motion vector derivation (DMVD). The techniques of this disclosure may be used as an efficient coding tool in any future video coding standards.

In general, this disclosure describes techniques for deriving motion information (e.g., one or more motion vectors, a motion vector and/or motion vector difference precision, and one or more reference picture indexes) used to encode blocks of video data and for determining by a video decoder the same motion information as that determined by the video encoder. Using the same (or reciprocal) derivation techniques used by the video encoder, a video decoder may determine, without receiving any syntax elements specifically identifying the motion information, what motion information was used to encode the video data. In some coding scenarios, however, the video encoder may still explicitly signal the motion information used to encode the block.

Various techniques in this disclosure may be described with reference to a video coder, which is intended to be a generic term that can refer to either a video encoder or a video decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current layer, current block, current picture, current slice, etc. In the context of this disclosure, the term current is intended to identify a layer, block, picture, slice, etc. that is currently being coded, as opposed to, for example, previously coded layers, blocks, pictures, and slices or yet to be coded blocks, pictures, and slices.

A new video coding standard, named High Efficiency Video Coding (HEVC) (also referred to as ITU-T H.265), including its range extension, multiview extension (MV-HEVC) and scalable extension (SHVC), was developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC specification, referred to as HEVC WD hereinafter, is available from phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Model 5 (JEM 5), is available at jvet.hhi.fraunhofer.de/svn/svn_HMJEMSoftware/tags/HM-16.6-JEM-5.0. An algorithm description of JEM 5 is available at phenix.it-sudparis.eu/jvet/doc_end_user/current_document.php?id=2714.

FIG. 1 is a block diagram illustrating an example video encoding and decoding system 10 that may utilize techniques for performing DMVD of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In other examples, a source device and a destination device may include other components or arrangements. For example, source device 12 may receive video data from an external video source 18, such as an external camera. Likewise, destination device 14 may interface with an external display device, rather than including an integrated display device. In accordance with this disclosure, video encoder 20 of source device 12 and/or video decoder 30 of destination device 14 may be configured to perform one or more DMVD techniques described herein. For example, video encoder 20 and/or video decoder 30 may be configured to apply one or more constraints to (1) a MV derived by DMVD, and/or (2) a MV difference between an initial MV and an MV derived by DMVD. A constraint may include a limitation on the motion vectors derived by the DMVD process. Example constraints of this disclosure may include constraints that mandate some predefined relationship between MV and MVDs in two reference picture lists (e.g., List0 and List1). When the constraint is applied to the DMVD, in certain examples, only the derived motion information which meets the constraint is regarded as valid motion information. Thus, the list of MVs and the final selected MV may be different had the constraint not have been used. In a first example, the constraint includes whether the derived MVs are symmetric. In a second example, the constraint includes whether the MV differences between the initial MVs and the MVs derived by DMVD methods are symmetric. In a third example, the constraint includes whether the derived MVs are anti-symmetric. In a fourth example, the constrain includes whether the MV differences between the initial MVs and the MVs derived by DMVD methods are anti-symmetric. In some examples, the enabling of symmetric/anti-symmetric MV/MV differences constraints are explicitly signaled. In other examples, the constraints may be implicitly determined according to some coded information.

In further examples, conditions may be placed on the constraints such that the constraint only applies in certain examples. Conditions may include a limitation on when constraints are enabled. For example, (1) the constraint is only enabled when the initial MVs are symmetric; (2) the constraint is only enabled when the initial MVs are pseudo symmetric; (3) the constraint is only enabled when the initial MVs are anti-symmetric; (4) the constraint is only enabled when the initial MVs are pseudo anti-symmetric; (5) the constraint is only enabled when the initial MVs are not symmetric; (6) the constraint is only enabled when the initial MVs are not pseudo symmetric; (7) the constraint is only enabled when the initial MVs are not anti-symmetric; (8) the constraint is only enabled when the initial MVs are not pseudo anti-symmetric; (9) the constraint is only enabled when List0 and List1 reference pictures of the initial MVs are both before or both after the current picture; (10) the constraint is only enabled when List0 and List1 reference pictures of the initial MVs are NOT both before or both after the current picture; (11) the constraint is only enabled when reference index of the initial MVs are both zero; (12) the constraint is only enabled when reference index of the initial MVs are NOT both zero; (13) the constraint is only enabled when the POC distances between List0 reference picture and current picture and the POC distances between List1 reference picture and current picture are the same; (14) the constraint is only enabled when the POC distances between List0 reference picture and current picture and the POC distances between List1 reference picture and current picture are NOT the same; (15) the constraint of symmetric MV difference is applied when the initial MVs are not symmetric; and/or (16) the constraint of anti-symmetric MV difference is applied when the initial MVs are symmetric.

In a further example, the MV resolution of symmetric constraint can be assigned in a deterministic fashion. In one example, for integer-pel refinement of Bilateral Template Matching, no symmetric/pseudo symmetric/asymmetric constraint should be imposed, and the aforementioned constraints are only on half-pel, quarter-pel, or higher-precision motion refinement. The level of constraint (at which MV resolution) can be signalled through SPS/PPS/Slice Header. The resolution can also be decided along with whether other motion-refinement tools such as BIO, sub-pel frame-rate up-conversion (FRUC) are enabled. For example, when BIO is enabled, the constraint should not be imposed on quarter-pel or higher-precision motion refinement.

In another example, the level of constraint can be made adaptive according to the absolute difference between List0 (also referred to as L0) and List1 (as referred to as L1) MVs, the scaled (based on their relative POC distance) absolute difference between List0 and List1 MVs, or the initial SAD values between the interpolated samples of List0 and List1 (namely, P0 and P1 in this example). Alternatively, the ratio of the SAD values between (current template, P0) and current template, P1) can be used to decide at what MV resolution the constraint should be imposed. In this example, if the ratio of the SAD values is lower than a threshold, then no aforementioned symmetric constraints should be imposed.

Furthermore, in some examples, a single constraint (e.g., symmetric MVs, symmetric MV difference, anti-symmetric MVs, or anti-symmetric MV difference) is applied to derived MVs based on a condition. In other examples, multiple constraints are applied to derived MVs based on multiple conditions.

The illustrated system 10 of FIG. 1 is merely one example. Techniques for performing DMVD of this disclosure may be performed by any digital video encoding and/or decoding device. For example, techniques for constraining (1) a MV derived by DMVD, and/or (2) a MV difference between an initial MV and an MV derived by DMVD may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder and/or decoder circuitry, such as one or more microprocessors, processing circuitry (including fixed function circuitry and/or programmable processing circuitry), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

In general, according to ITU-T H.265, a video picture may be divided into a sequence of coding tree units (CTUs) (or largest coding units (LCUs)) that may include both luma and chroma samples. Alternatively, CTUs may include monochrome data (i.e., only luma samples). Syntax data within a bitstream may define a size for the CTU, which is a largest coding unit in terms of the number of pixels. A slice includes a number of consecutive CTUs in coding order. A video picture may be partitioned into one or more slices. Each CTU may be split into coding units (CUs) according to a quadtree. In general, a quadtree data structure includes one node per CU, with a root node corresponding to the CTU. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a CTU may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a CTU may be split, referred to as a maximum CU depth, and may also define a minimum size of the coding nodes. Accordingly, a bitstream may also define a smallest coding unit (SCU). This disclosure uses the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and is generally square in shape. The size of the CU may range from 8×8 pixels up to the size of the CTU with a maximum size, e.g., 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs (or partitions of a CU) within a given CU defined for a partitioned CTU, although this may not always be the case. The TUs are typically the same size or smaller than the PUs (or partitions of a CU, e.g., in the case of intra prediction). In some examples, residual samples corresponding to a CU may be subdivided into smaller units using a quadtree structure known as a "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs) when predicted using inter-prediction. In general, a PU represents a spatial area corresponding to all or a portion of the corresponding CU, and may include data for retrieving and/or generating a reference sample for the PU. Moreover, a PU includes data related to prediction. When the CU is inter-mode encoded, one or more PUs of the CU may include data defining motion information, such as one or more motion vectors, or the PUs may be skip mode coded. Data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List0 or List1) for the motion vector.

Leaf-CUs may also be intra-mode predicted. In general, intra prediction involves predicting a leaf-CU (or partitions thereof) using an intra-mode. A video coder may select a set of neighboring, previously coded pixels to the leaf-CU to use to predict the leaf-CU (or partitions thereof).

A leaf-CU may also include one or more transform units (TUs). The transform units may be specified using an RQT (also referred to as a TU quadtree structure), as discussed above. For example, a split flag may indicate whether a leaf-CU is split into four transform units. Then, each TU may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, partitions of a CU, or the CU itself, may be collocated with a corresponding leaf-TU for the CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a CTU (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures, starting with a random-access point (RAP) picture. A video sequence may include syntax data in a sequence parameter set (SPS) that characteristics of the video sequence. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, prediction may be performed for PUs of various sizes. Assuming that the size of a particular CU is 2N×2N, intra-prediction may be performed on PU sizes of 2N×2N or N×N, and inter-prediction may be performed on symmetric PU sizes of 2N×2N, 2N×N, N×2N, or N×N. Asymmetric partitioning for inter-prediction may also be performed for PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs to include quantized transform coefficients representative of the residual data for the CU. That is, video encoder 20 may calculate the residual data (in the form of a residual block), transform the residual block to produce a block of transform coefficients, and then quantize the transform coefficients to form quantized transform coefficients. Video encoder 20 may form a TU including the quantized transform coefficients, as well as other syntax information (e.g., splitting information for the TU).

As noted above, following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In general, video decoder 30 performs a substantially similar, albeit reciprocal, process to that performed by video encoder 20 to decode encoded data. For example, video decoder 30 inverse quantizes and inverse transforms coefficients of a received TU to reproduce a residual block. Video decoder 30 uses a signaled prediction mode (intra- or inter-prediction) to form a predicted block. Then video decoder 30 combines the predicted block and the residual block (on a pixel-by-pixel basis) to reproduce the original block. Additional processing may be performed, such as performing a deblocking process to reduce visual artifacts along block boundaries. Furthermore, video decoder 30 may decode syntax elements using CABAC in a manner substantially similar to, albeit reciprocal to, the CABAC encoding process of video encoder 20.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

Figure 2:
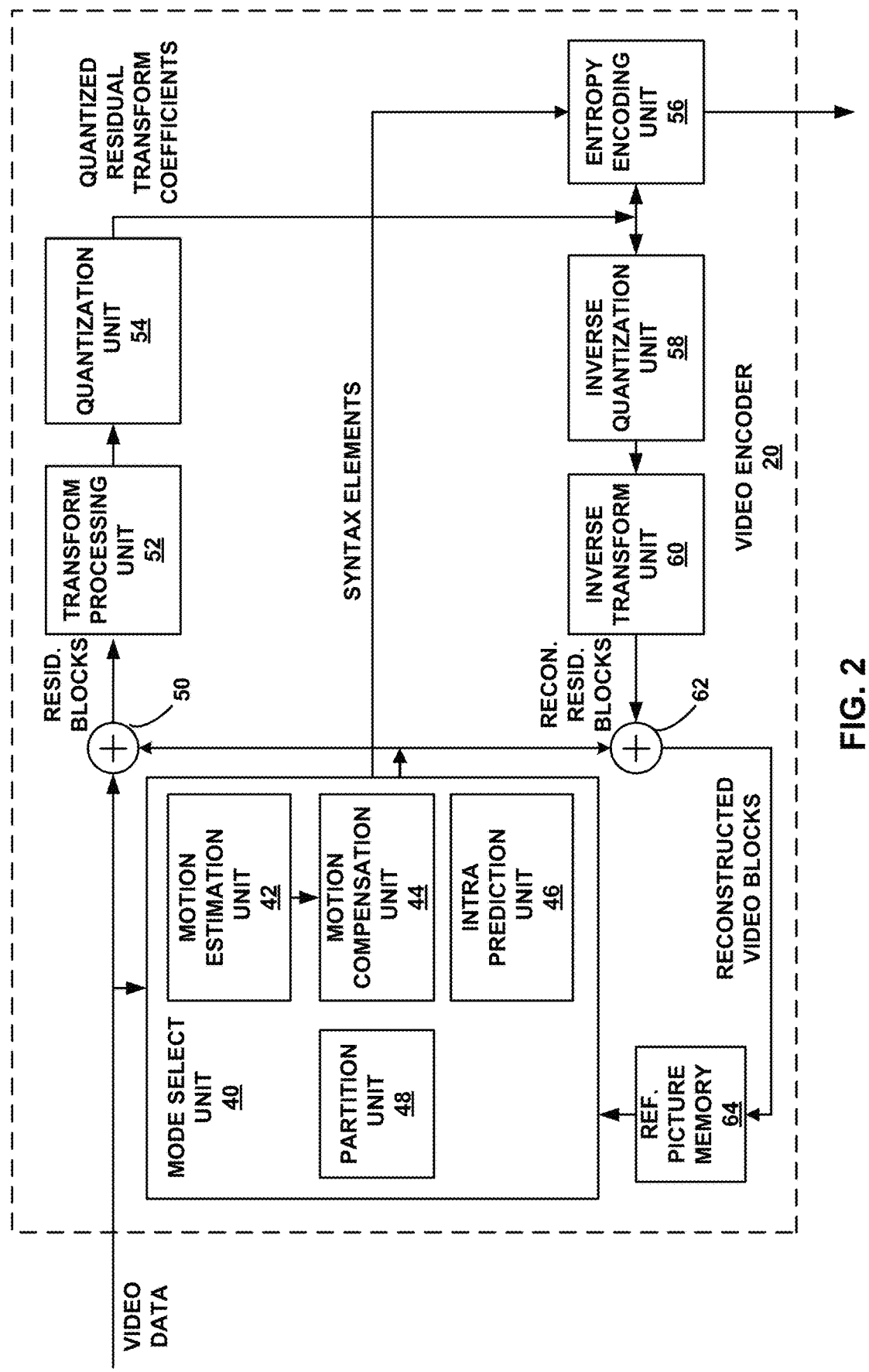
FIG. 2 is a block diagram illustrating an example of a video encoder that may implement techniques for performing DMVD of this disclosure.

FIG. 2 is a block diagram illustrating an example of video encoder 20 that may be configured to perform one or more DMVD techniques of this disclosure. For example, video encoder 20 may be configured to apply one or more constraints to (1) a MV derived by DMVD, and/or (2) a MV difference between an initial MV and an MV derived by DMVD. When the constraint is applied to the DMVD, in certain examples, only the derived motion information which meets the constraint is regarded as valid motion information. Thus, the list of MVs and the final selected MV may be different had the constraint not have been used.

In a first example, the constraint includes whether the derived MVs are symmetric. In a second example, the constraint includes whether the MV differences between the initial MVs and the MVs derived by DMVD methods are symmetric. In a third example, the constraint includes whether the derived MVs are anti-symmetric. In a fourth example, the constrain includes whether the MV differences between the initial MVs and the MVs derived by DMVD methods are anti-symmetric. In some examples, the enabling of symmetric/anti-symmetric MV/MV differences constraints are explicitly signaled. In other examples, the constraints may be implicitly determined according to some coded information. In further examples, conditions may be placed on the constraints such that the constraint only applies in some examples.

In particular, video encoder 20 may perform the DMVD techniques of this disclosure during a reconstruction loop, which includes processes performed by inverse quantization unit 58, inverse transform unit 60, and summer 62. Furthermore, as discussed above, video encoder 20 may signal certain values that may assist a video decoder, such as video decoder 30, in performing DMVD.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes video data memory 66, mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

Video data memory 66 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-prediction modes. Video data memory 101 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 101 may be provided by the same memory device or separate memory devices. In various examples, video data memory 101 may be on-chip with other components of video encoder 20, or off-chip relative to those components.

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively perform intra-predictive encoding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into CTUs, and partition each of the CTUs into sub-CUs based on rate-distortion analysis (e.g., rate-distortion optimization). Mode select unit 40 may further produce a quadtree data structure indicative of partitioning of a CTU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List0) or a second reference picture list (List1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 3:
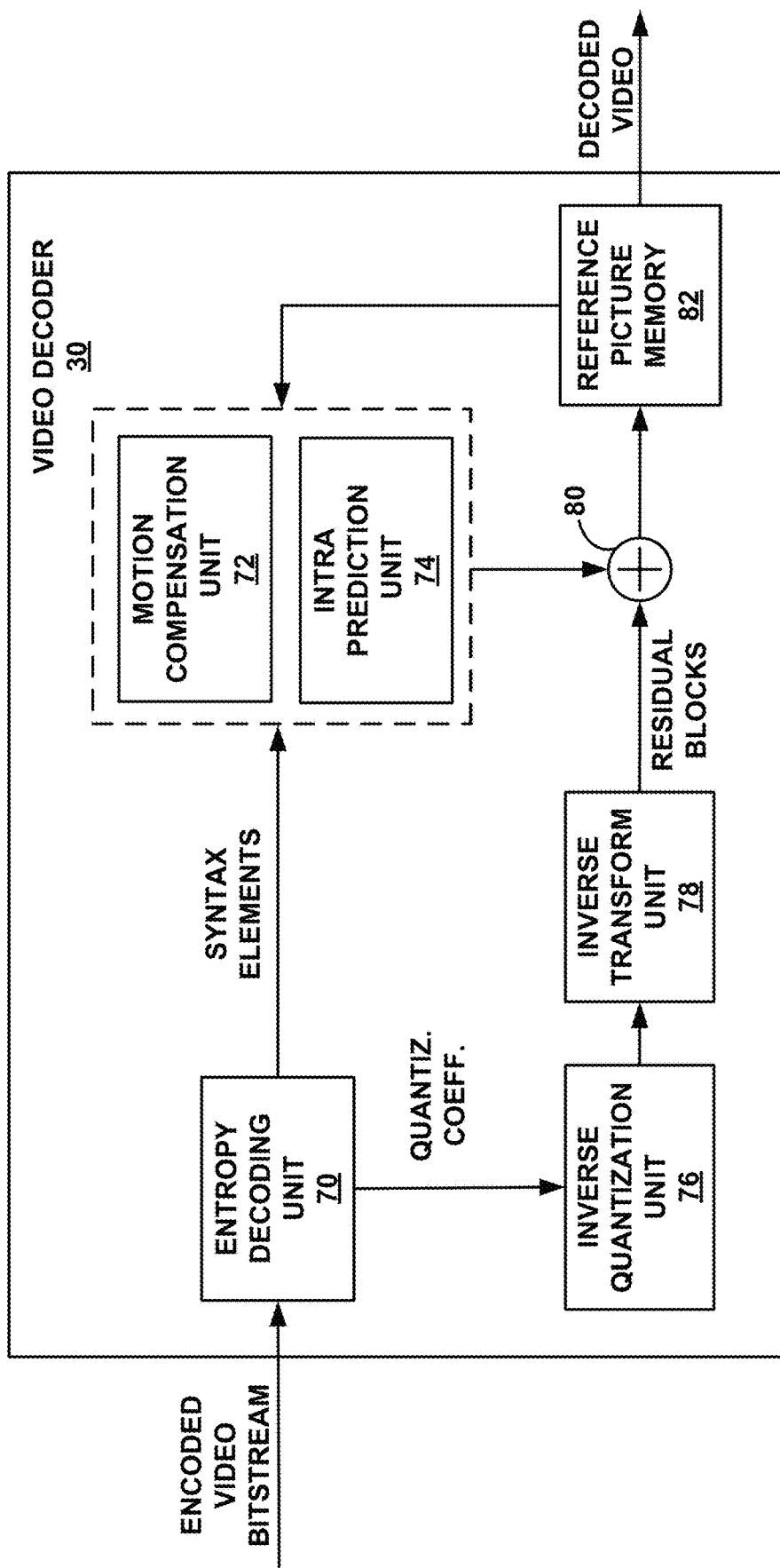
FIG. 3 is a block diagram illustrating an example of a video decoder that may implement techniques for performing DMVD of this disclosure.

FIG. 3 is a block diagram illustrating an example of video decoder 30 that may be configured to perform one or more DMVD techniques of this disclosure. For example, video decoder 30 may be configured to apply one or more constraints to (1) a MV derived by DMVD, and/or (2) a MV difference between an initial MV and an MV derived by DMVD. When the constraint is applied to the DMVD, in certain examples, only the derived motion information which meets the constraint is regarded as valid motion information. Thus, the list of MVs and the final selected MV may be different had the constraint not have been used.

In a first example, the constraint includes whether the derived MVs are symmetric. In a second example, the constraint includes whether the MV differences between the initial MVs and the MVs derived by DMVD methods are symmetric. In a third example, the constraint includes whether the derived MVs are anti-symmetric. In a fourth example, the constrain includes whether the MV differences between the initial MVs and the MVs derived by DMVD methods are anti-symmetric. In some examples, the enabling of symmetric/anti-symmetric MV/MV differences constraints are explicitly signaled. In other examples, the constraints may be implicitly determined according to some coded information. In further examples, conditions may be placed on the constraints such that the constraint only applies in some examples.

In the example of FIG. 3, video decoder 30 includes video data memory 68, an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

Video data memory 68 may store encoded video data, such as an encoded video bitstream, to be decoded by the components of video decoder 30. The video data stored in video data memory 68 may be obtained, for example, from computer-readable medium 16, e.g., from a local video source, such as a camera, via wired or wireless network communication of video data, or by accessing physical data storage media. Video data memory 68 may form a coded picture buffer (CPB) that stores encoded video data from an encoded video bitstream. Reference picture memory 82 may be a memory that stores reference video data for use in decoding video data by video decoder 30, e.g., in intra- or inter-prediction modes, or for output. Video data memory 68 and reference picture memory 82 may be formed by any of a variety of memory devices, such as DRAM), including SDRAM, MRAM, RRAM, or other types of memory devices. Video data memory 68 and reference picture memory 82 may be provided by the same memory device or separate memory devices. In various examples, video data memory 68 may be on-chip with other components of video decoder 30, or off-chip relative to those components.

Video data memory 68 receives and stores encoded video data (e.g., NAL units) of a bitstream. Entropy decoding unit 70 may receive encoded video data (e.g., NAL units) from video data memory 68 and may parse the NAL units to obtain syntax elements. Entropy decoding unit 70 may entropy decode entropy-encoded syntax elements in the NAL units. During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List0 and List1, using default construction techniques based on reference pictures stored in reference picture memory 82. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In accordance with the techniques of this disclosure, a video coder, such as video encoder 20 and video decoder 30, may perform DMVD to derive motion information for a current block of video data. In particular, these techniques may include any or all of the following techniques, alone or in any combination.

One of the concepts of this disclosure is to improve the DMVD. The techniques are elaborated in several different itemized aspects as discussed below. The following techniques to improve DMVD may be applied individually. Alternatively, any combination of the techniques described in this disclosure may be applied together. The following DMVD techniques, whether applied individually or in any combination, may increase coding efficiency and/or reduce bit-rate. For example, constraining (1) a MV derived by DMVD, and/or (2) a MV difference between an initial MV and an MV derived by DMVD may increase coding efficiency and/or reduce bit-rate. In each of the foregoing examples, the constraints may be applied based on a condition.

In HEVC, the largest coding unit in a slice is called a coding tree block (CTB) or coding tree unit (CTU). A CTB contains a quad-tree the nodes of which are coding units. The size of a CTB can be in a range from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter-coded, it may be further partitioned into 2 or 4 prediction units (PUs) or become just one PU when further partition does not apply. When two PUs are present in one CU, they can be half size rectangles or two rectangles with ¼ or ¾ size of the CU. When the CU is inter-coded, one set of motion information is present for each PU. In addition, each PU is coded with a unique inter-prediction mode to derive the set of motion information.

In the HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (List0 and list 1) and the reference indices. If a merge candidate is identified by a merge index, the reference pictures are used for the prediction of the current blocks, as well as the associated motion vectors are determined. However, under AMVP mode for each potential prediction direction from either List0 or List1, a reference index needs to be explicitly signaled, together with an MV predictor (MVP) index to the MV candidate list since the AMVP candidate contains only a motion vector. In AMVP mode, the predicted motion vectors can be further refined. As can be seen above, a merge candidate corresponds to a full set of motion information while an AMVP candidate contains just one motion vector for a specific prediction direction and reference index. The candidates for both modes are derived similarly from the same spatial and temporal neighboring blocks.

The concept of DMVD techniques is for a video coder (e.g., video encoder 20 or video decoder 30) to derive motion information, such as motion vectors and prediction directions, using previously decoded information. As used herein, the acronym "MV" stands for motion vector. List0 and List1 are two lists that are constructed as lists of pictures in the decoded picture buffer (DPB) or reference picture memory 82 (of FIG. 3). An index called a reference picture index is used to identify a particular picture in one of these lists. For uni-prediction, a picture can be selected from either of these lists. For bi-prediction, two pictures are selected, one of each list (e.g., one from List0 and one from List1). In current approaches, the List0 and List1 MVs derived by DMVD are determined independently for some DMVD techniques, such as Bilateral Template Matching and frame-rate up-conversion (FRUC) Template Matching. In this disclosure, when deriving bi-prediction MVs (e.g., a pair of MVs including a List0 MV and a List1 MV) based on initial MVs, a constraint of symmetric/anti-symmetric MV and/or symmetric/anti-symmetric MV difference may be applied. In some examples, more than one constraint may be applied, such as applying a symmetric MV constraint and a symmetric MV difference constraint. A constraint may include one or more conditions. In some examples, when a constraint is applied to DMVD (e.g., by applying a constraint to a MV and/or MV difference derived from DMVD), only the derived motion information which meets (e.g., passes) the constraint may be regarded as valid motion information. For example, a MV derived from DMVD that meets (e.g., passes) a constraint may be regarded as a valid MV, and a MV derived from DMVD that does not meet the constraint may be regarded as an invalid MV. As another example, a MV difference derived from DMVD that meets a constraint may be regarded as a valid MV difference, and a MV difference derived from DMVD that does not meet the constraint may be regarded as an invalid MV difference. In some examples, a video coder (e.g., video encoder 20 or video decoder 30) may be configured to use valid motion vector information to code video data (e.g., a current block of video data) and not use invalid motion vector information to code video data (e.g., a current block of video data). In some examples, the valid motion vector information may then be compared with other valid motion vector information and the valid motion vector information determined to have the lowest cost metric is selected.

Figure 4B:
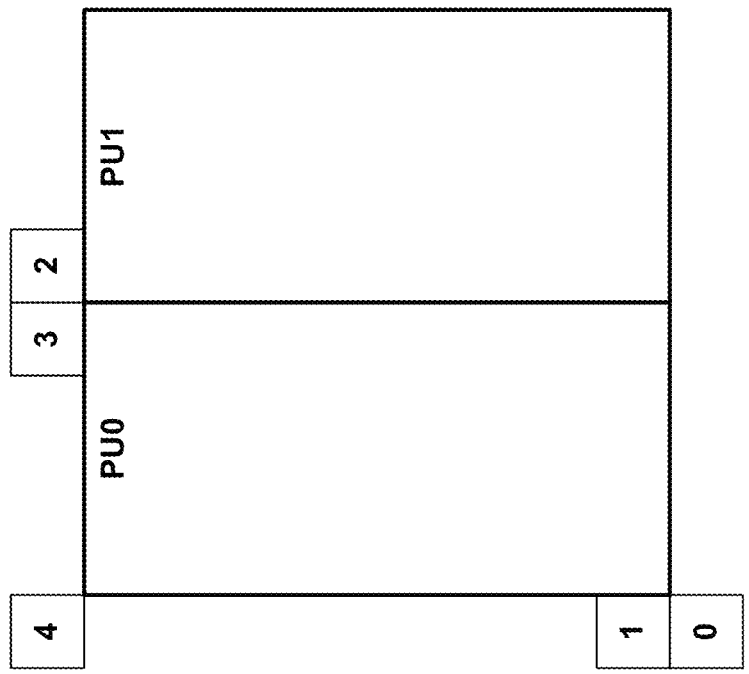
FIGS. 4A and 4B is a conceptual diagram illustrating spatial motion vector candidates derived from neighboring blocks.
Figure 4A:
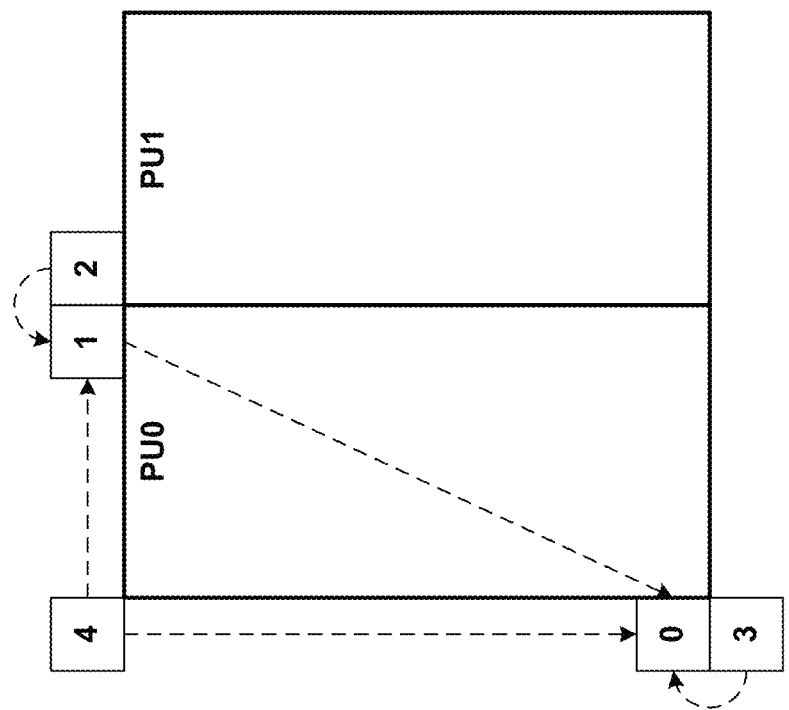

Spatial MV candidates are derived from the neighboring blocks shown in FIG. 4, for a specific PU (PU0), although the methods for generating the candidates from the blocks differ for merge and AMVP modes. In merge mode, up to four spatial MV candidates can be derived with the orders shown in FIG. 4A with numbers, and the order is the following: left (0, A1), above (1, B1), above right (2, B0), below left (3, A0), and above left (4, B2), as shown in FIG. 4A.

In AVMP mode, the neighboring blocks are divided into two groups: left group consisting of the block 0 and 1, and above group consisting of the blocks 2, 3, and 4 as shown in FIG. 4B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 5B:
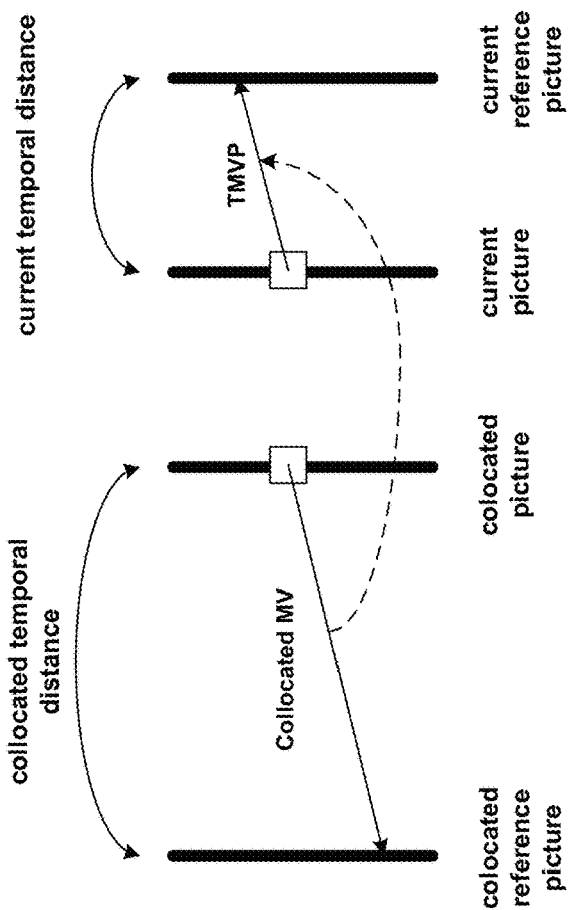
FIGS. 5A and 5B is a conceptual diagram illustrating a primary block location for a temporal motion vector predictor (TMVP) candidate.
Figure 5A:
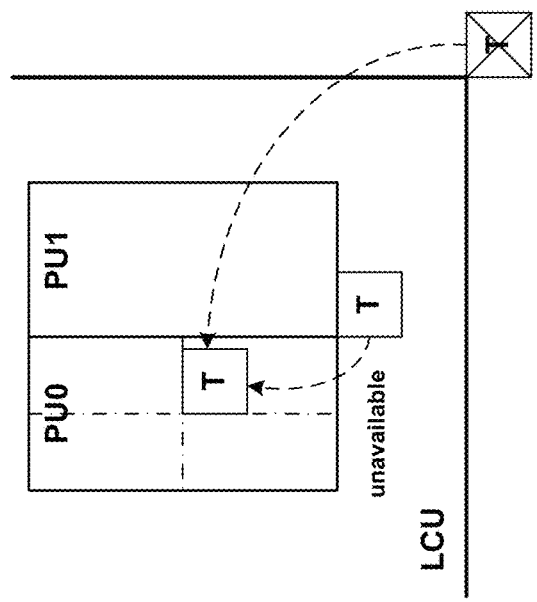

Temporal motion vector predictor (TMVP) candidates, if enabled and available, are added into the MV candidate list after spatial motion vector candidates. The process of motion vector derivation for TMVP candidate is the same for both merge and AMVP modes, however the target reference index for the TMVP candidate in the merge mode may always be set to 0. The primary block location for TMVP candidate derivation is the bottom right block outside of the collocated PU as shown in FIG. 5A as a block "T", to compensate the bias to the above and left blocks used to generate spatial neighboring candidates. However, if that block is located outside of the current CTB row or motion information is not available, the block is substituted with a center block of the PU.

A motion vector for the TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV need to be scaled to compensate the temporal distance differences, as shown in FIG. 5.

Several aspects of merge mode and AMVP mode are discussed below.

Motion vector scaling: It is assumed that the value of motion vectors is proportional to the distance of pictures in the presentation time. A motion vector associates two pictures, the reference picture, and the picture containing the motion vector (namely the containing picture). When a motion vector is used to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete (i.e., is less than a predetermined maximum number of candidates), artificial motion vector candidates are generated and inserted at the end of the list until it will have all candidates.

In merge mode, there are two types of artificial MV candidates: combined candidate derived only for B-slices and zero candidates used only for AMVP if the first type does not provide enough artificial candidates.

For each pair of candidates that are already in the candidate list and have necessary motion information, bi-directional combined motion vector candidates are derived by a combination of the motion vector of the first candidate referring to a picture in the List0 and the motion vector of a second candidate referring to a picture in the List1.

Pruning process for candidate insertion: Candidates from different blocks may happen to be the same, which decreases the efficiency of a merge/AMVP candidate list. A pruning process is applied to solve this problem. It compares one candidate against the others in the current candidate list to avoid inserting identical candidate in certain extent. To reduce the complexity, only limited numbers of pruning processes are applied, instead of comparing each potential candidate with all the other existing candidates.

In one example of the JEM reference software, there are several inter coding tools which derive or refine the motion vector (MV) for a current block at the decoder side. These DMVD approaches are elaborated as below.

Figure 6:
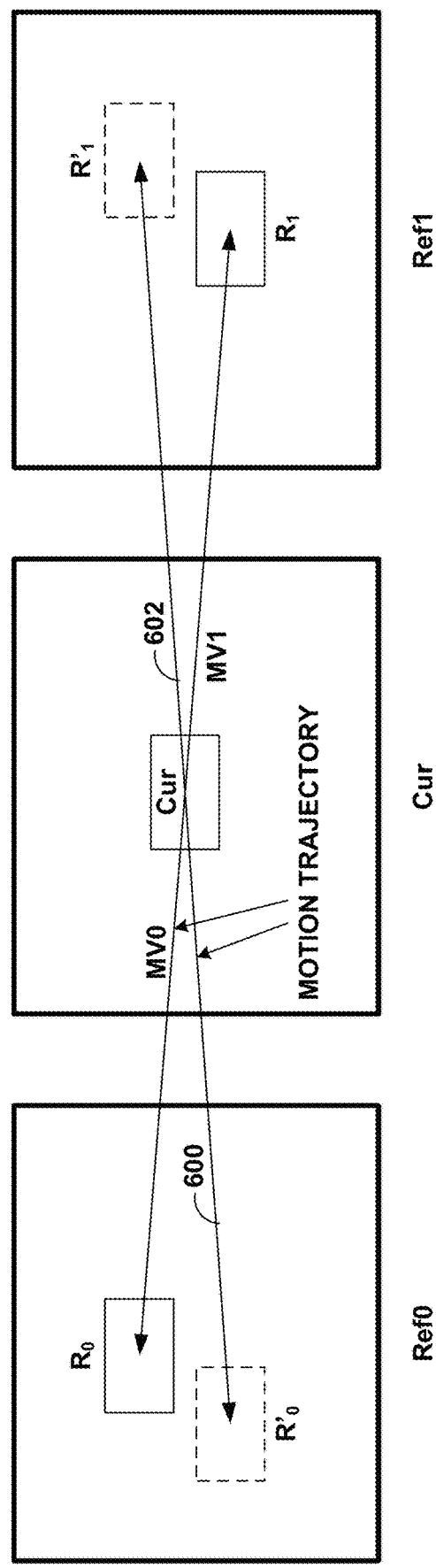
FIG. 6 is a conceptual diagram illustrating concepts related to bilateral matching for deriving motion information of a current block.
Figure 7:
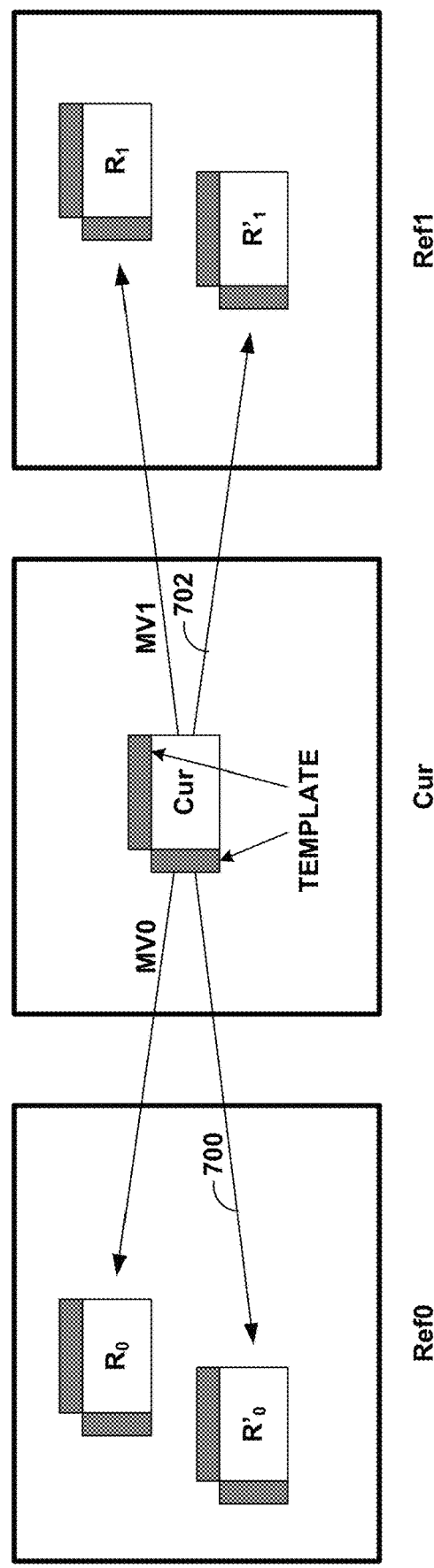
FIG. 7 is a conceptual diagram illustrating concepts related to template matching for deriving motion information of a current block.

FIGS. 6 and 7 are conceptual diagrams illustrating concepts for pattern matched motion vector derivation (PM-MVD). PMMVD mode is a special merge mode based on Frame-Rate Up Conversion (FRUC) techniques. With this mode, motion information of a block is not signaled but derived at decoder side. This technology was included in one example of JEM.

A FRUC flag is signaled for a CU when its merge flag is true. When the FRUC flag is false, a merge index is signaled and the regular merge mode is used. When the FRUC flag is true, an additional FRUC mode flag is signaled to indicate which method (bilateral matching or template matching) is to be used to derive motion information for the block.

During the motion derivation process, an initial motion vector is first derived for the whole CU based on bilateral matching or template matching. First, the merge list of the CU, or called PMMVD seeds, is checked and the candidate which leads to the minimum matching cost (e.g., a rate-distortion (RD) cost) is selected as the starting point. Then a local search based on bilateral matching or template matching around the starting point is performed and the MV results in the minimum matching cost is taken as the MV for the whole CU. Subsequently, the motion information is further refined at sub-block level with the derived CU motion vectors as the starting points.

According to the present techniques of this disclosure, constraints may be applied to the derived CU motion vectors based on whether, e.g., the MV derived by DMVD is symmetric or anti-symmetric, and/or (2) a MV difference between an initial MV and an MV derived by DMVD is symmetric or anti-symmetric. In each of the foregoing examples, the constraints may be applied based on a condition, e.g., about the initial MVs or derived MVs.

As shown in the FIG. 6, bilateral matching is used to derive motion information of the current block (Cur) by finding the best match between two reference blocks ($R_0$ and $R_1$) along the motion trajectory of the current block in two different reference pictures (Ref0 and Ref1). The motion trajectory may include the path that a pixel in a block follows through space and time when considering an image sequence (e.g., reference frames and the current frame) as a 3-dimensional continuous spatio-temporal field. Under the assumption of continuous motion trajectory, the motion vectors MV0 and MV1 pointing to the two reference blocks ($R_0$ and $R_1$) are proportional to the temporal distances between the current picture (Cur) and the two reference pictures (Ref0 and Ref1). Derived MVs 600 and 602 are derived using bilateral matching and point to reference blocks R'$_0$ and R'$_1$ respectively. As a special case, when the current picture (Cur) is temporally between the two reference pictures (Ref0 and Ref1) and the temporal distance from the current picture to the two reference pictures is the same, the bilateral matching becomes mirror based bi-directional MV. Consequentially, derived motion vectors 600 and 602 similarly are mirrored.

As shown in FIG. 7, template matching is used to derive motion information of the current block (Cur) by finding the best match between a template (top and/or left neighboring blocks of the current block) in the current picture and a block (same size to the template) in a reference picture (Ref0 and Ref1). A template may include neighboring pixels of a block that is used to compare a block of interest (Cur) with candidate references (R$_0$ with MV0 and R$_1$ with MV1) or derived references (R'$_0$ with MV 700 and R'$_1$ with MV 702) by searching neighboring blocks of R$_0$ and R$_1$. The most similar reference is then used as the prediction.

At video encoder 20, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Figure 8:
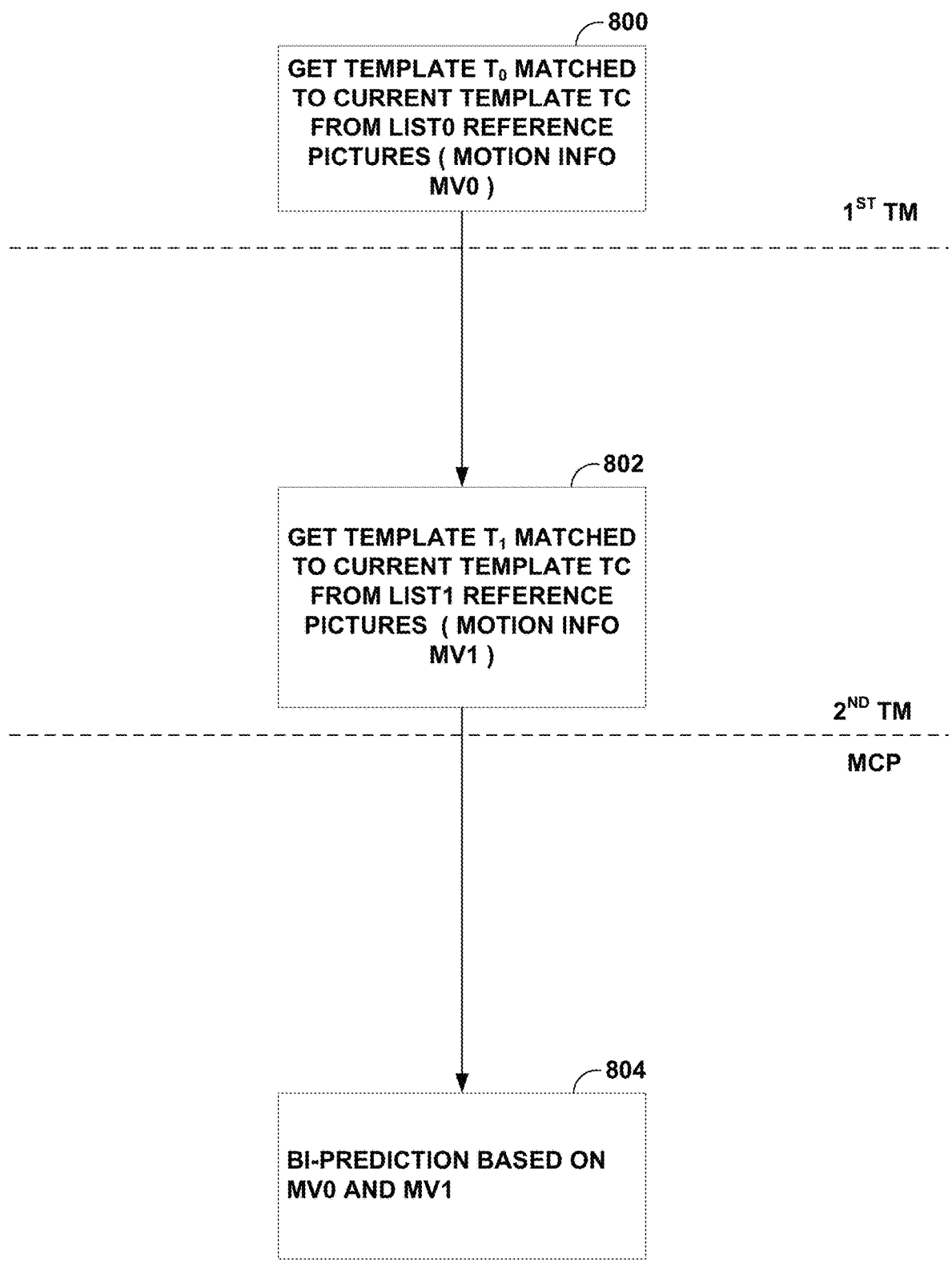
FIG. 8 is a flowchart illustrating an example frame-rate up-conversion (FRUC) template matching process.

In the 5$^{th}$ JVET meeting, "Enhanced Template Matching in FRUC Mode," JVET-E0035, available at http://phenix.it-sudparis.eu/jvet/, was proposed to further improve FRUC Template matching. A flowchart of an exemplary FRUC template matching mode is shown in FIG. 8. In the first step, a template T$_0$ (and its corresponding motion information MV0) is found to match current template Tc of current block from list0 reference pictures. In the second step, template T$_1$ (and its corresponding motion information MV1) is found from list1 reference pictures. The obtained motion information MV0 and MV1 are used to perform bi-prediction to generate predictor of the current block.

FRUC template matching mode may be enhanced by introducing bi-directional template matching and adaptive selection between uni-prediction and bi-prediction. Exemplary modifications relative to FIG. 8 are underlined in FIG. 9.

Bi-directional template matching may be implemented based on uni-directional template matching. As shown in FIG. 8, a matched template T$_0$ is first found in the first step of template matching from List0 reference pictures (800). Note that List0 here is only taken as an example. In fact, whether List0 or List1 used in the first step is adaptive to initial distortion cost between current template and initial template in corresponding reference picture. The initial template can be determined with initial motion information of the current block which is available before performing the first template matching. The reference picture list corresponding to minimal initial template distortion cost will be used in the first step of template matching. For example, if initial template distortion cost corresponding to list0 is no larger than cost corresponding to List1, List0 is used in the first step of template matching and List1 is used in the second step), then, the current template Tc of current block is updated as follows:

$$T'_C = 2*T_C - T_0$$

The updated current template T'$_C$, instead of the current template T$_C$, is used to find another matched template T$_1$ from List1 reference pictures in the second template matching (802). As a result, the matched template T$_1$ is found by jointly using List0 and List1 reference pictures (804). This matching process is called bi-directional template matching.

Figure 9:
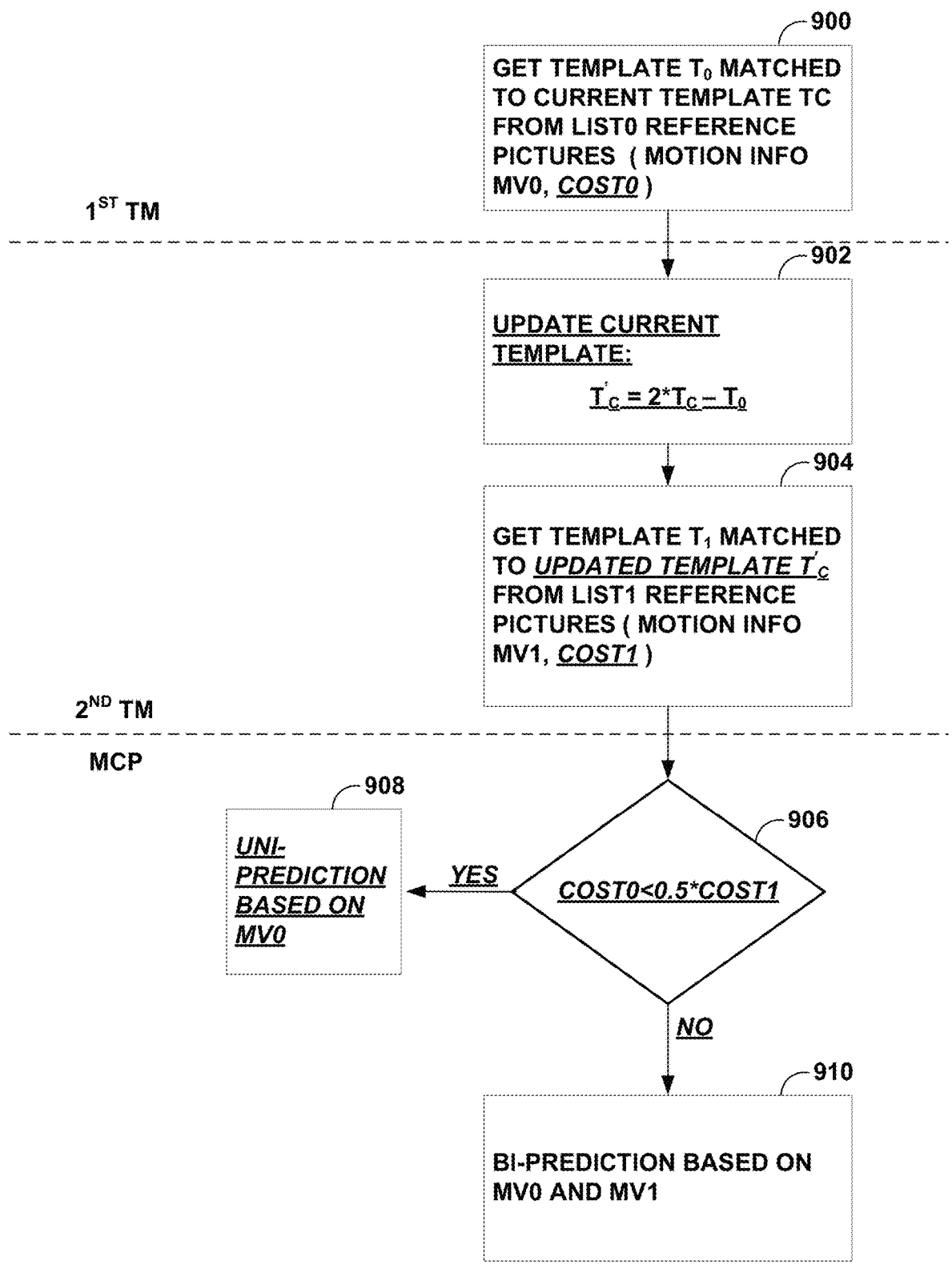
FIG. 9 is a flowchart illustrating example proposed changes to the FRUC template matching process of FIG. 8.

The selection between uni-prediction and bi-prediction for motion compensation prediction (MCP) may be based on template matching distortion. As shown in FIG. 9, during template matching, distortion between template T$_0$ and Tc (the current template) can be calculated as cost0 (900), the current template may be updated (902), and distortion between template T$_1$ and T'$_C$ (the updated current template) can be calculated as cost1 (904). If cost0 is less than 0.5*cost1 (906), uni-prediction based on MV0 may be applied to FRUC template matching mode (908); otherwise, bi-prediction based on MV0 and MV1 is applied (910). Note that cost0 is compared to 0.5*cost1 since cost1 indicates a difference between template T$_1$ and T'$_C$ (the updated current template), which is 2 times of difference between Tc (the current template) and its prediction of 0.5*(T$_0$+T$_1$). It is noted that MCP may be applied to PU-level motion refinement. Sub-PU level motion refinement may be kept unchanged.

In accordance with techniques of this disclosure, video encoder 20 and video decoder 30 may constrain derived motion vectors from the FRUC template matching mode (both uni- and bi-directional) at the PU-level or sub-PU level based on whether (1) the constraint includes whether the derived MVs are symmetric, (2) whether the MV differences between the initial MVs and the MVs derived by DMVD methods are symmetric, (3) whether the derived MVs are anti-symmetric, and/or (4) whether the MV differences between the initial MVs and the MVs derived by DMVD methods are anti-symmetric. Conditions may be placed on the constraints such that the constraint only applies based on the initial MVs or FRUC template.

Figure 10:
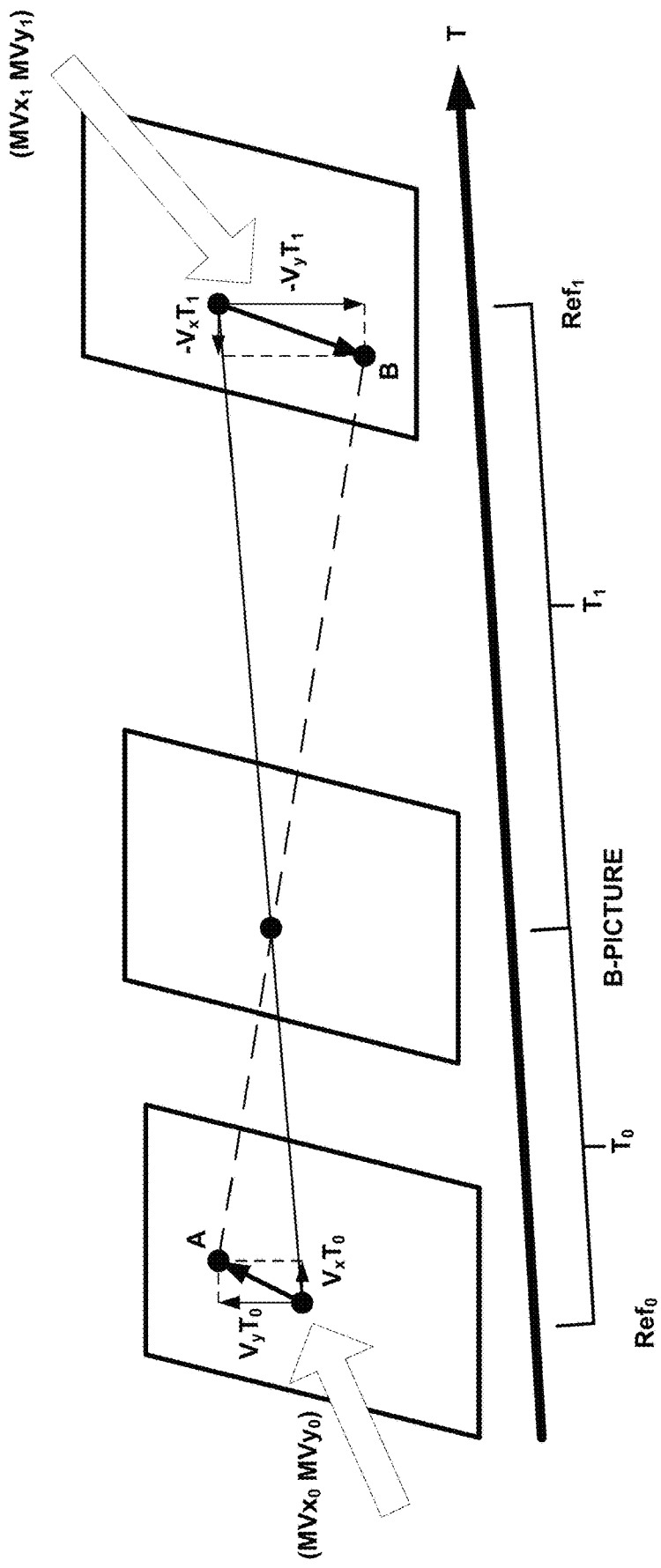
FIG. 10 is a conceptual diagram illustrating concepts related to an example of bi-directional optical flow.

FIG. 10 is a conceptual diagram illustrating concepts related to bi-directional optical flow in one example of JEM. Bi-directional Optical flow (BIO) is pixel-wise motion refinement which is performed on top of block-wise motion compensation in a case of bi-prediction. Since BIO compensates the fine motion inside the block, enabling BIO results in enlarging block size for motion compensation. Sample-level motion refinement does not require exhaustive search or signaling, since there is an explicit equation that gives fine motion vector for each sample.

Let I$^{(k)}$ be luminance value from reference k (k=0, 1) after compensation block motion, and $\partial I^{(k)}/\partial x$, $\partial I^{(k)}/\partial y$ are horizontal and vertical components of the I$^{(k)}$ gradient respectively. Assuming the optical flow is valid, the motion vector field (v$_x$,v$_y$) is given by an equation $$\partial I^{(k)}/\partial t + v_x \partial I^{(k)}/\partial x + v_y \partial I^{(k)}/\partial y = 0. \quad (1)$$

Combining optical flow equation with Hermite interpolation for motion trajectory of each sample one gets a unique polynomial of third order which matches both function values I$^{(k)}$ and derivatives $\partial I^{(k)}/\partial x$, $\partial I^{(k)}/\partial y$ at the ends. The value of this polynomial at t=0 is BIO prediction:

$$pred_{BIO} = 1/2 \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (2)$$

Here $\tau_0$ and $\tau_1$ denote the distance to reference frames as shown on a FIG. 10. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (both from the past or both from the future) then signs are different $\tau_0 \cdot \tau_1 < 0$. In this case, BIO is applied only if prediction come not from the same time moment ($\tau_0 \neq \tau_1$), both referenced regions have non-zero motion ($MVx_0$, $MVy_0$, $MVx_1$, $MVy_1 \neq 0$) and block motion vectors are proportional to the time distance ($MVx_0/MVx_1 = MVy_0/MVy_1 = -\tau_0/\tau_1$).

The motion vector field $(v_x, v_y)$ is determined by minimizing the difference $\Delta$ between values in points A and B (intersection of motion trajectory and reference frame planes on FIG. 10). Model uses only first linear term of local Taylor expansion for $\Delta$:

$$\Delta = (I^{(0)} - I^{(1)})_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (3)$$

All values in (1) depend on sample location (i', j'), which was omitted so far. Assuming the motion is consistent in local surrounding we minimize $\Delta$ inside $(2M+1)\times(2M+1)$ square window $\Omega$ centered in currently predicted point (i,j):

$$(v_x, v_y) = \underset{v_x, v_y}{\operatorname{argmin}} \sum_{[i',j']\in\Omega} \Delta^2[i', j'] \quad (4)$$

For this optimization problem, a simplified solution is used, making first minimization in vertical and then in horizontal directions. It results in $$v_x = (s_1 + r) > m ? \operatorname{clip3}\left(-thBIO, thBIO, -\frac{s_3}{(s_1+r)}\right) : 0 \quad (5)$$

$$v_y = (s_5 + r) > m ? \operatorname{clip3}\left(-thBIO, thBIO, -\frac{s_6 - v_x s_2/2}{(s_5+r)}\right) : 0 \quad (6)$$

where, $$s_1 = \sum_{[i',j']\in\Omega} (\tau_1 \partial I^{(1)}/\partial x + \tau_0 \partial I^{(0)}/\partial x)^2; \quad (7)$$

$$s_3 = \sum_{[i',j']\in\Omega} (I^{(1)} - I^{(0)})(\tau_1 \partial I^{(1)}/\partial x + \tau_0 \partial I^{(0)}/\partial x);$$

$$s_2 = \sum_{[i',j']\in\Omega} (\tau_1 \partial I^{(1)}/\partial x + \tau_0 \partial I^{(0)}/\partial x)(\tau_1 \partial I^{(1)}/\partial y + \tau_0 \partial I^{(0)}/\partial y);$$

$$s_5 = \sum_{[i',j']\in\Omega} (\tau_1 \partial I^{(1)}/\partial y + \tau_0 \partial I^{(0)}/\partial y)^2;$$

$$s_6 = \sum_{[i',j']\in\Omega} (I^{(1)} - I^{(0)})(\tau_1 \partial I^{(1)}/\partial y + \tau_0 \partial I^{(0)}/\partial y)$$

In order to avoid division by zero or very small value, regularization parameters r and m are introduced in equations (2), (3).

$$r = 500 \cdot 4^{d-8} \quad (8)$$

$$m = 700 \cdot 4^{d-8} \quad (9)$$

Here d is internal bit-depth of the input video.

In some examples, the MV refinement of BIO might be unreliable due to noise or irregular motion. Therefore, in BIO, the magnitude of MV refinement is clipped to a certain threshold (thBIO). The threshold value is determined based on whether all the reference pictures of the current picture are all from one direction. If all the reference pictures of the current pictures of the current picture are from one direction, the value of the threshold is set to $12 \times 2^{14-d}$, otherwise, it is set to $12 \times 2^{13-d}$.

Gradients for BIO are calculated at the same time with motion compensation interpolation using operations consistent with HEVC motion compensation process (2D separable Finite Impulse Response (FIR)). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient $\partial I/\partial y$ first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

Figure 11:
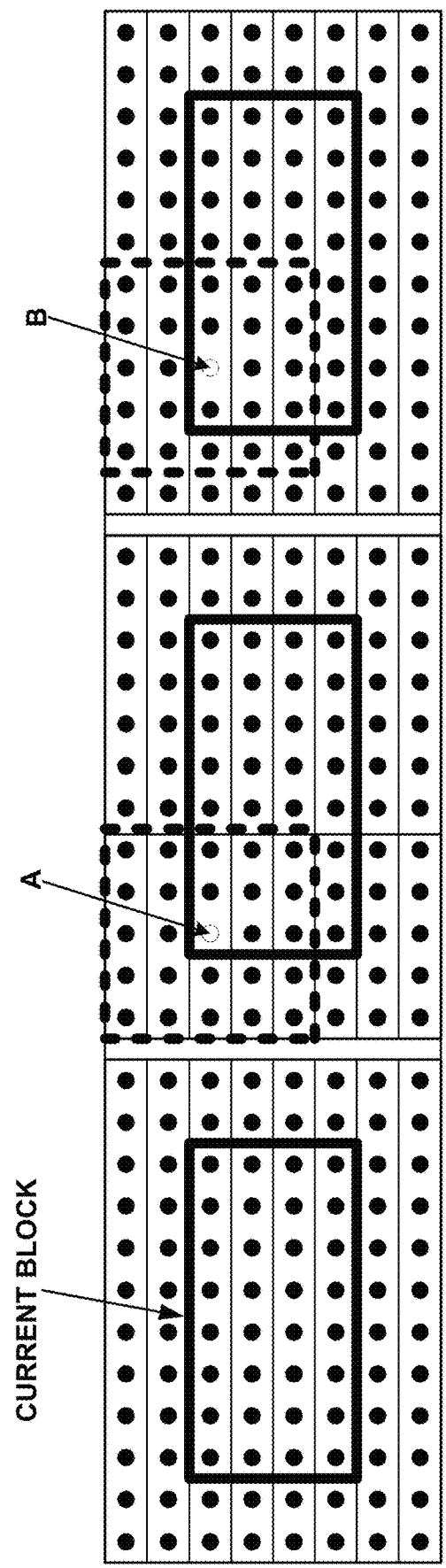
FIG. 11 is a conceptual diagram illustrating an example of gradient calculation for an 8×4 block.

FIG. 11 is a conceptual diagram illustrating an example of gradient calculation for an 8×4 block. For an 8×4 block, a video coder fetches the motion compensated predictors and calculates the horizontal/vertical (HOR/VER) gradients of all the pixels within a current block, as well as the outer two lines of pixels, because solving $v_x$ and $v_y$ for each pixel needs the HOR/VER gradient values and motion compensated predictors of the pixels within the window $\Omega$ centered in each pixel as shown in equation (4). And in one example of JEM, the size of this window is set to 5×5. Therefore, the video coder (e.g., video encoder 20 and/or video decoder 30) fetches the motion compensated predictors and calculates the gradients for the outer two lines of pixels around points A and B.

TABLE 1

Filters for gradients calculation in BIO

| Fractional pel position | Interpolation filter for gradient (BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {1, 4, −57, 57, −4, 1} |

TABLE 2

Interpolation filters for prediction signal generation in BIO

| Fractional pel position | Interpolation filter for prediction signal (BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {1, −7, 38, 38, −7, 1} |

In examples of JEM, BIO is applied to all bi-directional predicted blocks when the two predictions are from different reference pictures. When local illumination compensation (LIC) is enabled for a CU, BIO is disabled.

In accordance with the techniques of this disclosure, video encoder 20 and video decoder 30 may constrain derived motion vectors from the BIO based on whether (1) the constraint includes whether the derived MVs are symmetric, (2) whether the MV differences between the initial MVs and the MVs derived by DMVD methods are symmetric, (3) whether the derived MVs are anti-symmetric, and/or (4) whether the MV differences between the initial MVs and the MVs derived by DMVD methods are anti-symmetric. Conditions may be placed on the constraints such that the constraint only applies based on the initial MVs.

Figure 12:
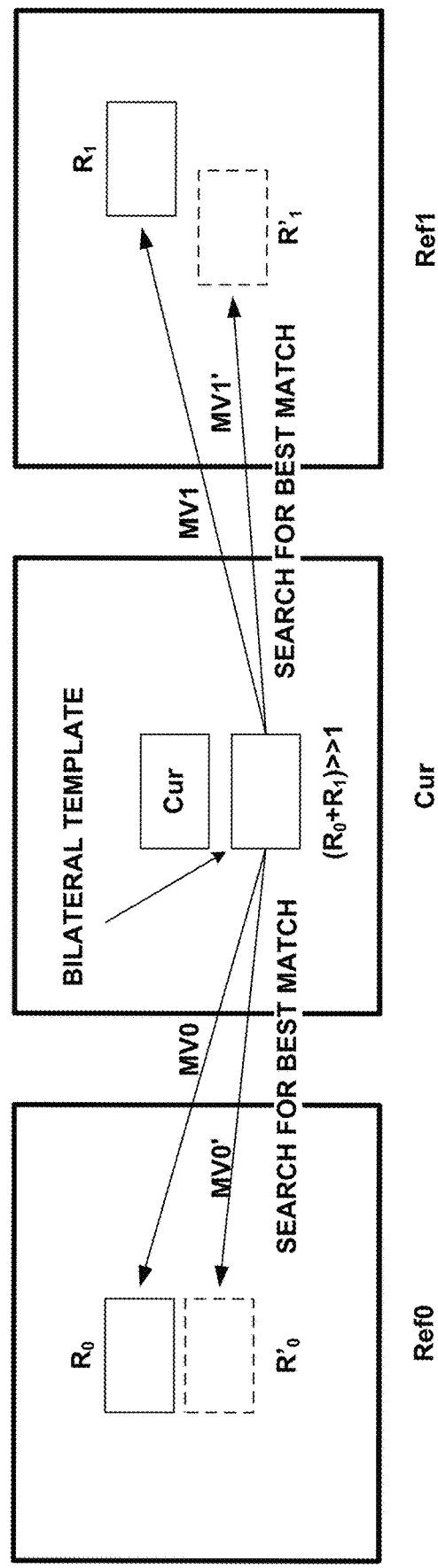
FIG. 12 is a conceptual diagram illustrating concepts related to DMVD based on bilateral template matching.

FIG. 12 is a conceptual diagram illustrating concepts related to the proposed decoder-side motion vector derivation (DMVD) based on bilateral template matching. A video coder may generate a bilateral template as the weighted combination of the two prediction blocks ($R_0$ and $R_1$), from the initial MV0 of List0 and MV1 of List1 respectively, as shown in FIG. 12. In one example, a bilateral template may be generated by averaging the List0 and List1 reference blocks ($R_0$ and $R_1$) using the formula: (R0+R1)>>1 or (R0+R1)/2.

The template matching operation includes calculating cost measures between the generated template and the sample region (around the initial prediction block) in the reference picture. For each of the two reference pictures ($R_0$ and $R_1$), the MV that yields the minimum template cost is considered as the updated MV of that list to replace the initial MV (either MV0 from List0 or MV1 from List1). Finally, the two new MVs, i.e., MV0' and MV1', as shown in FIG. 12, are used for regular bi-prediction. As it is commonly used in block-matching motion estimation, the sum of absolute differences (SAD) is utilized as cost measure.

Decoder-side motion vector derivation (DMVD) may be applied for merge mode of bi-prediction with one from the reference picture in the past and the other from reference picture in the future, without the transmission of additional syntax element. In JEM4.0, when LIC, affine, sub-CU merge candidate, or FRUC is selected for one CU, DMVD is not applied.

In accordance with the techniques of this disclosure, video encoder 20 and video decoder 30 may constrain derived motion vectors from bilateral template matching based DMVD based on whether (1) the constraint includes whether the derived MVs are symmetric, (2) whether the MV differences between the initial MVs and the MVs derived by DMVD methods are symmetric, (3) whether the derived MVs are anti-symmetric, and/or (4) whether the MV differences between the initial MVs and the MVs derived by DMVD methods are anti-symmetric. Conditions may be placed on the constraints such that the constraint only applies based on the initial MVs or the bilateral template.

Figure 13A:
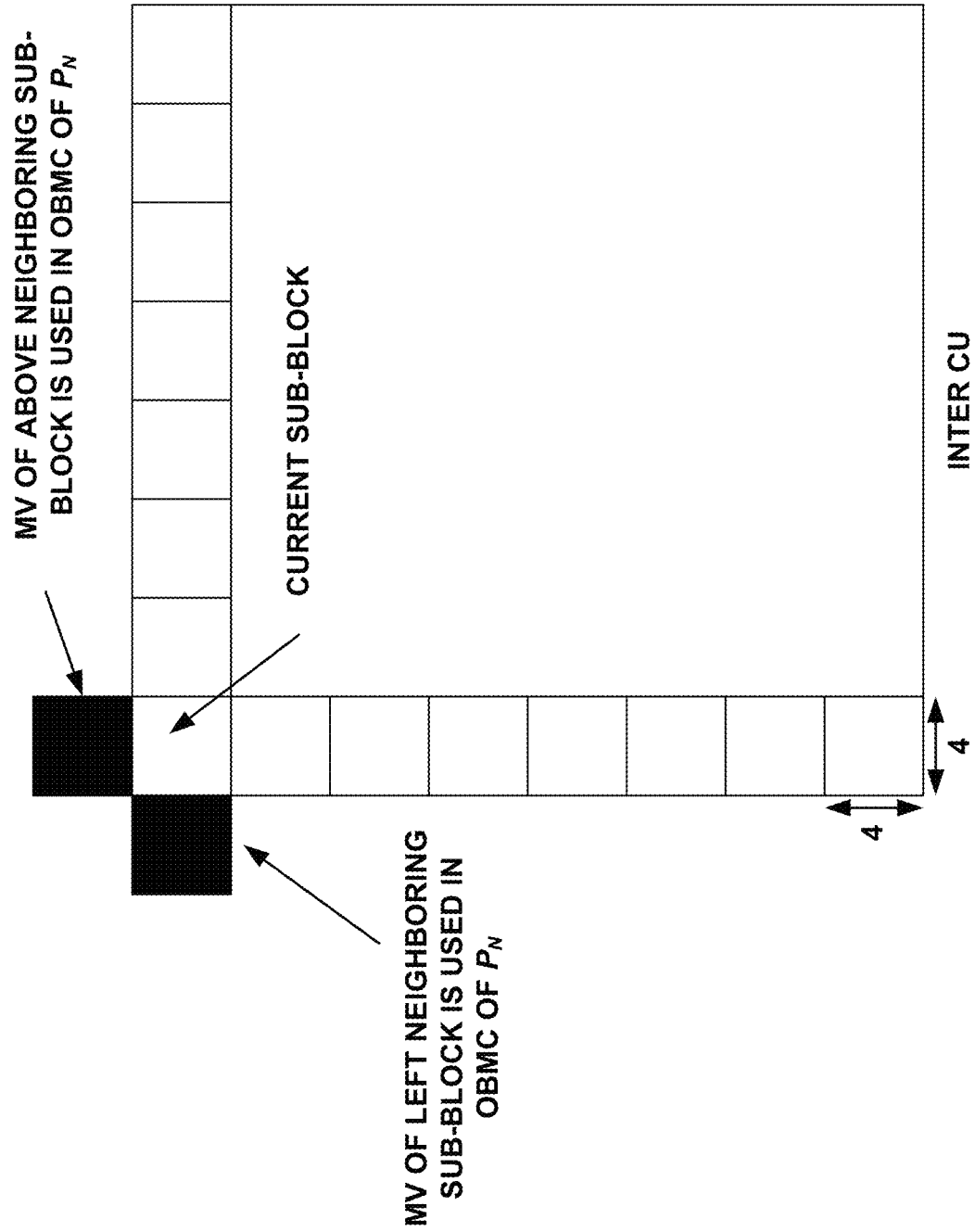
FIGS. 13A and 13B is a conceptual diagram illustrating concepts related to overlapped block motion compensation (OBMC).
Figure 13B:
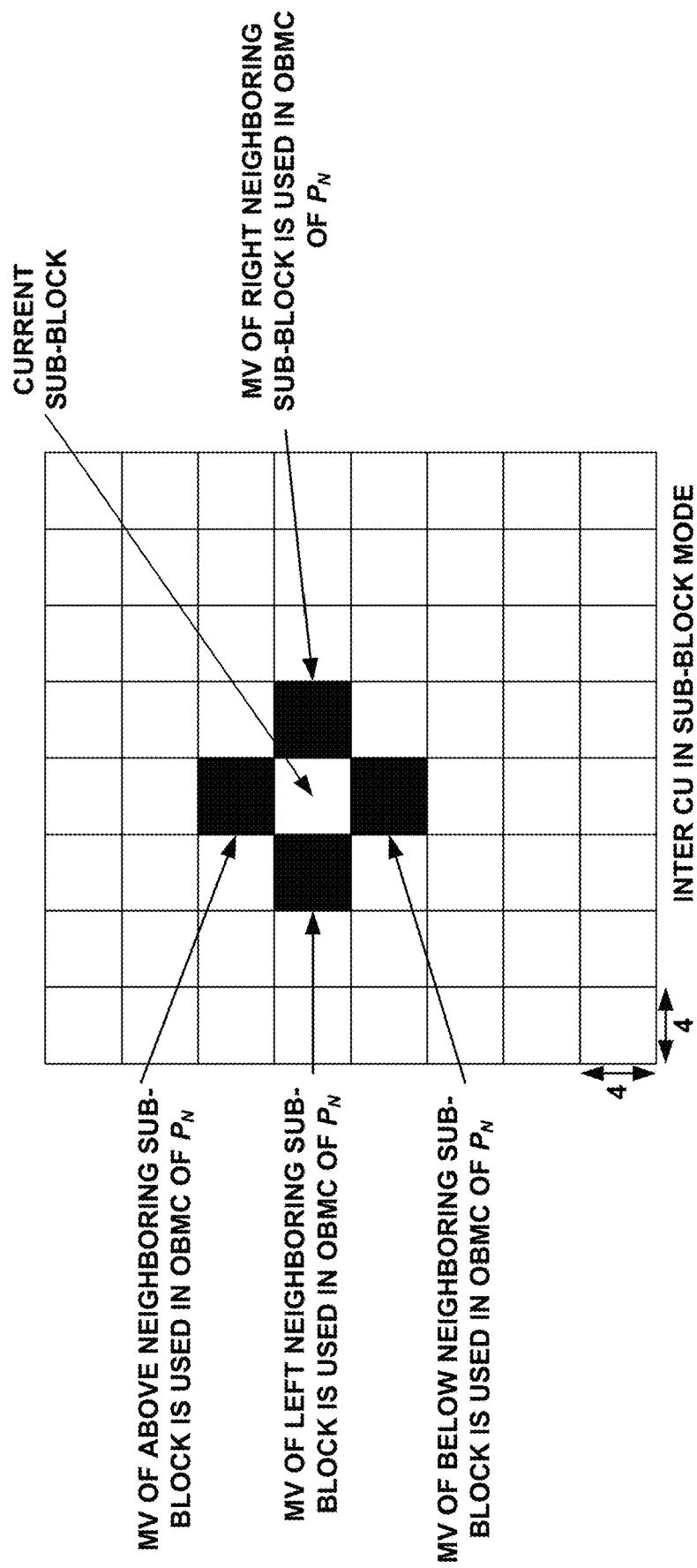
Figure 14A:
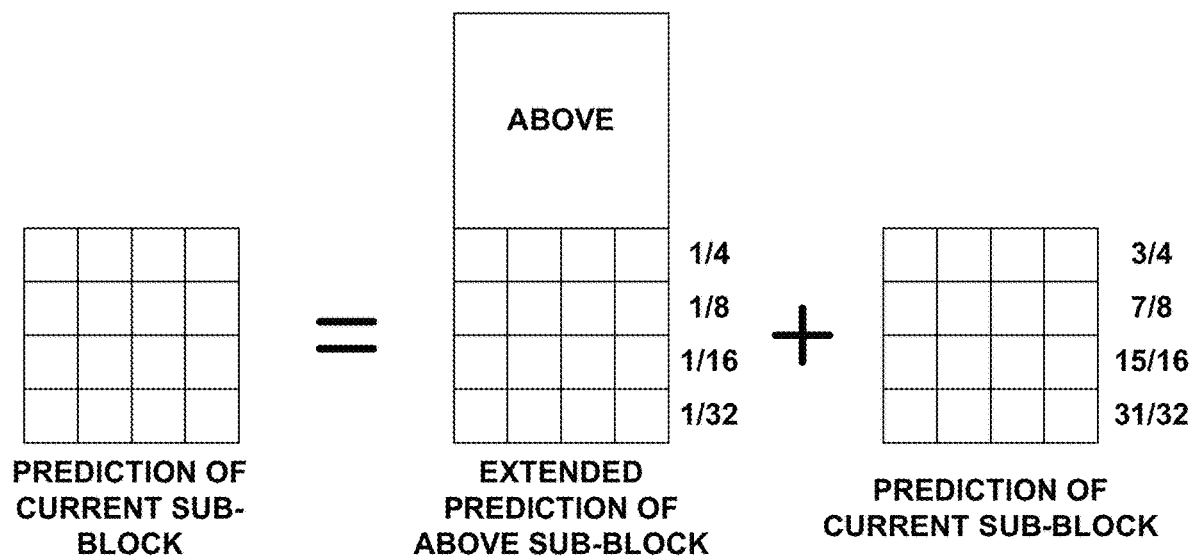
FIGS. 14A-14D are conceptual diagrams illustrating OBMC weightings.
Figure 14B:
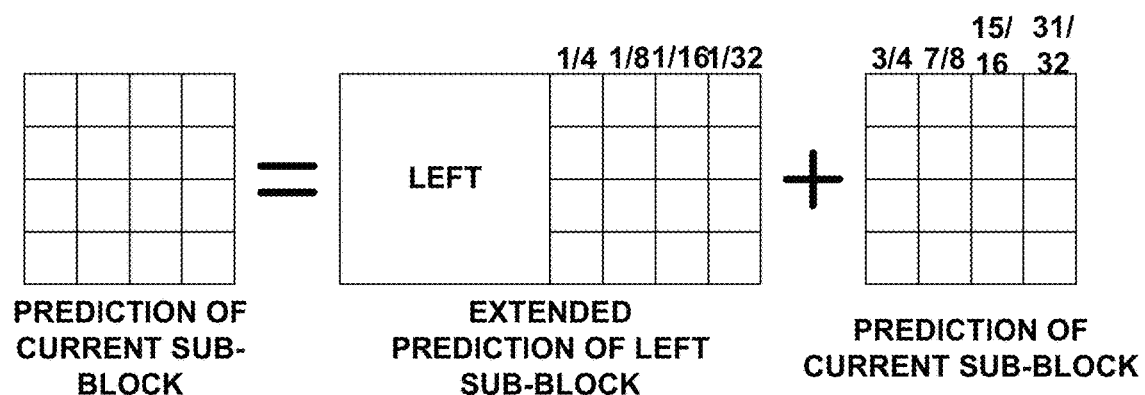
Figure 14C:
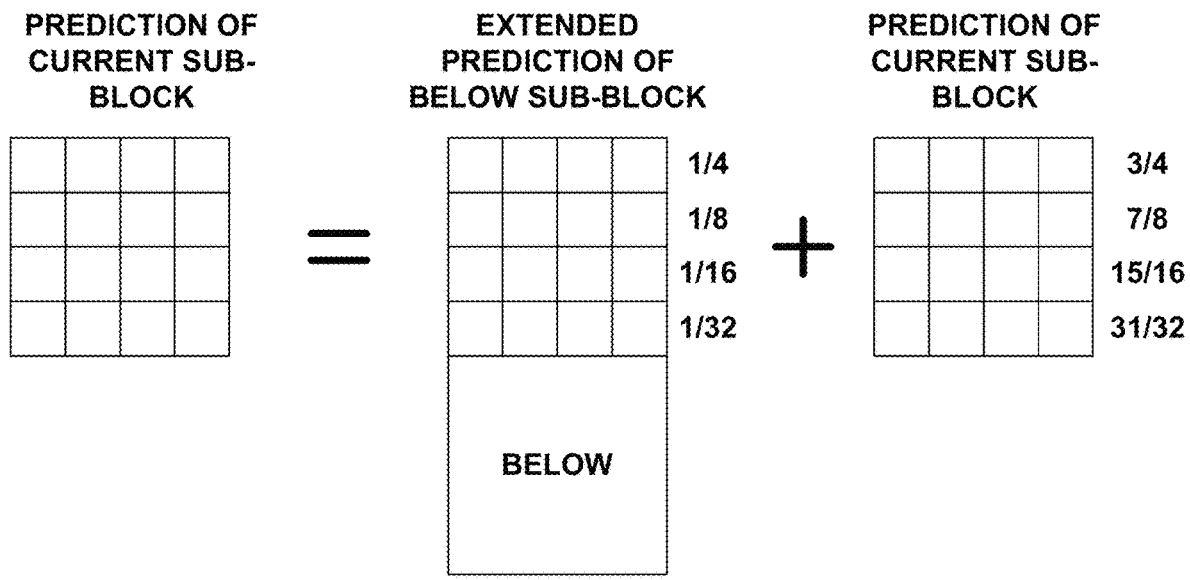
Figure 14D:
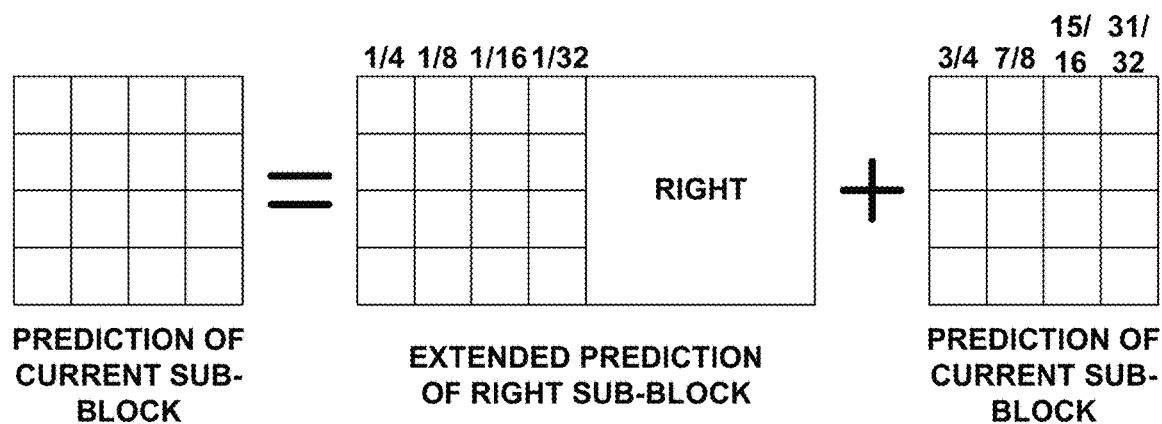

FIGS. 13A and 13B are conceptual diagrams illustrating concepts related to overlapped block motion compensation (OBMC) in examples of JEM. OBMC has been used for early generations of video standards, e.g., as in H.263. In examples of JEM, OBMC is performed for Motion Compensated (MC) block boundaries except the right and bottom boundaries of a CU. Moreover, it is applied for both luma and chroma components. In one example of JEM, a MC block corresponds to a coding block. When a CU is coded with sub-CU mode (including sub-CU merge, Affine and FRUC mode), each sub-block of the CU is a MC block. To process CU boundaries in a uniform fashion, OBMC is performed at the sub-block level for all MC block boundaries, where sub-block size is set equal to 4×4, as illustrated in FIGS. 13A and 13B.

Video encoder 20 and video decoder 30 may apply OBMC to the current sub-block, besides current motion vectors, motion vectors of four connected neighboring sub-blocks, if available and are not identical to the current motion vector, are also used to derive prediction block for the current sub-block. These multiple prediction blocks based on multiple motion vectors are combined to generate the final prediction signal of the current sub-block.

FIGS. 14A-14D are conceptual diagrams illustrating OBMC weightings. FIGS. 14A-14D illustrate a prediction block based on motion vectors of a neighboring sub-block is denoted as $P_N$, with N indicating an index for the neighboring above (FIG. 14A), below (FIG. 14B), left (FIG. 14C) and right (FIG. 14D) sub-blocks and prediction block based on motion vectors of the current sub-block is denoted as $P_C$. When $P_N$ is based on the motion information of a neighboring sub-block that contains the same motion information to the current sub-block, the OBMC is not performed from $P_N$. Otherwise, every pixel of $P_N$ is added to the same pixel in $P_C$, i.e., four rows/columns of $P_N$ are added to $P_C$. The weighting factors $\{1/4, 1/8, 1/16, 1/32\}$ are used for $P_N$ and the weighting factors $\{3/4, 7/8, 15/16, 31/32\}$ are used for PC. The exception are small MC blocks, (i.e., when height or width of the coding block is equal to 4 or a CU is coded with sub-CU mode), for which only two rows/columns of $P_N$ are added to $P_C$. In this case weighting factors $\{1/4, 1/8\}$ are used for $P_N$ and weighting factors $\{3/4, 7/8\}$ are used for $P_C$. For $P_N$ generated based on motion vectors of vertically (horizontally) neighboring sub-block, pixels in the same row (column) of $P_N$ are added to $P_C$ with a same weighting factor. It is noted that BIO is also applied for the derivation of the prediction block $P_N$.

In examples of JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during motion estimation stage. The prediction signal by using motion information of the top neighboring block and the left neighboring block is used to compensate the top and left boundaries of the original signal of the current CU, and then the normal motion estimation process is applied.

In accordance with the techniques of this disclosure, video encoder 20 and video decoder 30 may constrain derived motion vectors from OBMC based on whether (1) the constraint includes whether the derived MVs are symmetric, (2) whether the MV differences between the initial MVs and the MVs derived by DMVD methods are symmetric, (3) whether the derived MVs are anti-symmetric, and/or (4) whether the MV differences between the initial MVs and the MVs derived by DMVD methods are anti-symmetric. Conditions may be placed on the constraints such that the constraint only applies based on the initial MVs.

DMVD-related methods (e.g., BIO, FRUC Bilateral Matching, FRUC Template Matching, Bilateral Template matching and so on) may provide significant bit-rate reductions. This disclosure describes several techniques that may further improve DMVD, which may increase coding efficiency and/or reduce bit-rate. For example, constraining (1)

a MV derived by DMVD, and/or (2) a MV difference between an initial MV and an MV derived by DMVD may increase coding efficiency and/or reduce bit-rate.

Table 3 below describes various terminologies used below.

TABLE 3

| | |
|---|---|
| L0_POC_Init, L0_MV_X_Init, L0_MV_Y_Init, L1_POC_Init, L1_MV_X_Init, L1_MV_Y_Init | The X, Y components of the initial MVs in List0 and List1 The initial picture order count for List0 and List1. Picture order count may be POC as defined in HEVC. |
| L0_POC_Derived, L0_MV_X_Derived, L0_MV_Y_Derived, L1_POC_Derived, L1_MV_X_Derived, L1_MV_Y_Derived | The X, Y components of the MVs derived by DMVD methods for L0 and L1 The derived picture order count for List0 and List1. Picture order count may be POC as defined in HEVC. |
| L0_MV_X_Diff, L0_MV_Y_Diff, L1_MV_X_Diff, L1_MV_Y_Diff | The X, Y components of the MV differences between the initial MVs and the derived MVs by DMVD methods of List0 and List1 |
| CURR_POC | Picture Order Count (e.g., POC as defined in HEVC) of current slice/picture |

Symmetric Motion Vectors—In some examples, MVs derived by DMVD may be constrained by a video coder (e.g., video encoder 20 or video decoder 30), such that the derived MVs must be symmetric. In one example, to be symmetric, a video coder (e.g., video encoder 20 or video decoder 30) may be configured to constrain the derived MVs such that the derived MVs meet one or more (e.g., all) of the following conditions relative to each other:
1. L0_MV_X_Derived*(CURR_POC−L1_POC_Derived)=L1_MV_X_Derived*(CURR_POC−L0_POC_Derived), and/or
2. L0_MV_Y_Derived*(CURR_POC−L1_POC_Derived)=L1_MV_Y_Derived*(CURR_POC−L0_POC_Derived).

In some examples, conditions (1) and (2) above may each be considered a separate symmetric MV constraint, or may be considered a single symmetric MV constraint when both are applied. In this regard, reference to a constraint being enabled herein may refer to a condition being enabled, which operates as a constraint. For example, reference to a symmetric MV constraint being enabled may include (i) condition (1) above being enabled, (ii) condition (2) above being enabled, or (iii) conditions (1) and (2) being enabled.

In some examples, to achieve further simplifications and/or coding improvements, the MVs derived by DMVD may be constrained by a video coder (e.g., video encoder 20 or video decoder 30), such that the derived MVs may be required to meet one or more (e.g., all, conditions (a) and/or (b) when condition (1) is true, and/or conditions (c) and/or (d) when condition (2) is true) of the conditions below (which may be referred to as pseudo-symmetric conditions):
1. When List0 and List1 reference picture are both before or both after the current picture (e.g., (CURR_POC−L0_POC_Derived)*(CURR_POC−L1_POC_Derived)>0),
 a. L0_MV_X_Derived=L1_MV_X_Derived, and/or
 b. L0_MV_Y_Derived=L1_MV_Y_Derived; and/or
2. When List0 and List1 reference picture are not both before or not both after the current picture (e.g., (CURR_POC−L0_POC_Derived)*(CURR_POC−L1_POC_Derived)<0),
 c. L0_MV_X_Derived=−1*L1_MV_X_Derived, and/or
 d. L0_MV_Y_Derived=−1*L1_MV_Y_Derived.

In some examples, a video coder (e.g., video encoder 20 or video decoder 30) may be configured to check or determine a POC difference by being configured to use, for example, the POC information of the initial MVs and/or the POC information of the derived MVs. For example, a video coder (e.g., video encoder 20 or video decoder 30) may be configured to check or determine a POC difference based on, for example, the POC information of the initial MVs and/or the POC information of the derived MVs.

Symmetric Motion Vector Differences—In some examples, the MV differences between the initial MVs and the MVs derived by DMVD may be constrained by a video coder (e.g., video encoder 20 or video decoder 30), such that the MV differences must be symmetric. The MV difference is the difference between the initial MVs and the derived MVs by DMVD. The MV difference may be determined on an X component and Y component basis. In one example, to be symmetric, a video coder (e.g., video encoder 20 or video decoder 30) may be configured to require that the derived MV differences meet one or more (e.g., all) of the following conditions:
1. L0_MV_X_Diff*(CURR_POC−L1_POC_Derived)=L1_MV_X_Diff*(CURR_POC−L0_POC_Derived), and/or
2. L0_MV_Y_Diff*(CURR_POC−L1_POC_Derived)=L1_MV_Y_Diff*(CURR_POC−L0_POC_Derived).

In some examples, to achieve further simplifications and/or coding improvements, the MV differences derived by DMVD may be constrained by a video coder (e.g., video encoder 20 or video decoder 30), such that the derived MV differences may be required to meet one or more (e.g., all, conditions (a) and/or (b) when condition (1) is true, and/or conditions (c) and/or (d) when condition (2) is true) of the conditions below (which may be referred to as pseudo-symmetric conditions):
1. When List0 and List1 reference picture are both before or both after the current picture (e.g. (CURR_POC−L0_POC_Init)*(CURR_POC−L1_POC_Init)>0),
 a. L0_MV_X_Diff=L1_MV_X_Diff, and/or
 b. L0_MV_Y_Diff=L1_MV_Y_Diff; and/or
2. When List0 and List1 reference picture are NOT both before or both after the current picture (e.g. (CURR_POC−L0_POC_Init)*(CURR_POC−L1_POC_Init)<0),
 c. L0_MV_X_Diff=−1*L1_MV_X_Diff, and/or
 d. L0_MV_Y_Diff=−1*L1_MV_Y_Diff.

In some examples, a video coder (e.g., video encoder 20 or video decoder 30) may be configured to check or determine a POC difference by being configured to use, for example, the POC information of the initial MVs and/or the POC information of the derived MVs. For example, a video coder (e.g., video encoder 20 or video decoder 30) may be configured to check or determine a POC difference based on, for example, the POC information of the initial MVs and/or the POC information of the derived MVs.

Anti-Symmetric Motion Vectors—In some examples, MVs derived by DMVD may be constrained by a video coder (e.g., video encoder 20 or video decoder 30), such that the derived MVs must be anti-symmetric. In one example, to be anti-symmetric, a video coder (e.g., video encoder 20 or video decoder 30) may be configured to require that the derived MVs meet one or more (e.g., all) of the following conditions:

1. L0_MV_X_Derived*(CURR_POC−L1_POC_Derived)=−1*L1_MV_X_Derived*(CURR_POC−L0_POC_Derived), and/or
2. L0_MV_Y_Derived*(CURR_POC−L1_POC_Derived)=−1*L1_MV_Y_Derived*(CURR_POC−L0_POC_Derived).

In some examples, to achieve further simplifications and/or coding improvements, the MV differences derived by DMVD may be constrained by a video coder (e.g., video encoder 20 or video decoder 30), such that the derived MV differences may be required to meet one or more (e.g., all, conditions (a) and/or (b) when condition (1) is true, and/or conditions (c) and/or (d) when condition (2) is true) of the conditions below (which may be referred to as pseudo-anti-symmetric conditions):

1. When List0 and List1 reference picture are both before or both after the current picture (e.g. (CURR_POC−L0_POC_Derived)*(CURR_POC−L1_POC_Derived)>0),
   a. L0_MV_X_Derived=−1*L1_MV_X_Derived, and/or
   b. L0_MV_Y_Derived=−1*L1_MV_Y_Derived;
   and/or
2. When List0 and List1 reference picture are NOT both before or both after the current picture (e.g. (CURR_POC−L0_POC_Derived)*(CURR_POC−L1_POC_Derived)<0),
   c. L0_MV_X_Derived=L1_MV_X_Derived, and/or
   d. L0_MV_Y_Derived=L1_MV_Y_Derived.

In some examples, a video coder (e.g., video encoder 20 or video decoder 30) may be configured to check or determine a POC difference by being configured to use, for example, the POC information of the initial MVs and/or the POC information of the derived MVs. For example, a video coder (e.g., video encoder 20 or video decoder 30) may be configured to check or determine a POC difference based on, for example, the POC information of the initial MVs and/or the POC information of the derived MVs.

Anti-Symmetric Motion Vector Differences—In some examples, the MV differences between the initial MVs and the MVs derived by DMVD may be constrained by a video coder (e.g., video encoder 20 or video decoder 30), such that the MV differences must be anti-symmetric. In one example, to be anti-symmetric, a video coder (e.g., video encoder 20 or video decoder 30) may be configured to require that the derived MV differences meet one or more (e.g., all) of the following conditions:

1. L0_MV_X_Diff*(CURR_POC−L1_POC_Derived)=−1*L1_MV_X_Diff*(CURR_POC−L0_POC_Derived), and/or
2. L0_MV_Y_Diff*(CURR_POC−L1_POC_Derived)=−1*L1_MV_Y_Diff*(CURR_POC−L0_POC_Derived).

In some examples, to achieve further simplifications and/or coding improvements, the MV differences derived by DMVD may be constrained by a video coder (e.g., video encoder 20 or video decoder 30), such that the derived MV differences may be required to meet one or more (e.g., all, conditions (a) and/or (b) when condition (1) is true, and/or conditions (c) and/or (d) when condition (2) is true) of the conditions below (which may be referred to as pseudo-anti-symmetric conditions):

1. When List0 and List1 reference picture are both before or both after the current picture (e.g. (CURR_POC−L0_POC_Init)*(CURR_POC−L1_POC_Init)>0),
   a. L0_MV_X_Diff=−1*L1_MV_X_Diff, and/or
   b. L0_MV_Y_Diff=−1*L1_MV_Y_Diff;
   and/or
2. When List0 and List1 reference picture are NOT both before or both after the current picture (e.g. (CURR_POC−L0_POC_Init)*(CURR_POC−L1_POC_Init)<0),
   c. L0_MV_X_Diff=L1_MV_X_Diff, and/or
   d. L0_MV_Y_Diff=L1_MV_Y_Diff.

In some examples, a video coder (e.g., video encoder 20 or video decoder 30) may be configured to check or determine a POC difference by being configured to use, for example, the POC information of the initial MVs and/or the POC information of the derived MVs. For example, a video coder (e.g., video encoder 20 or video decoder 30) may be configured to check or determine a POC difference based on, for example, the POC information of the initial MVs and/or the POC information of the derived MVs.

Conditions For Applying The MV/MV Difference Constraints—The enablement of constraints (e.g., symmetric/anti-symmetric MV/MV difference constraints) on DMVD motion information may, in some examples, be explicitly signaled or may be implicitly determined according to some coded information. In some examples, signaling enablement of a constraint or determining the enablement of a constraint may be respectively described as signaling that a constraint was or is to be applied or determining that the constraint was or is to be applied.

In some examples, a video encoder (e.g., video encoder 20) may be configured to enable one or more of the MV and/or MV difference constraints described herein. For example, a video encoder (e.g., video encoder 20) may be configured to signal one or more values indicative of whether one or more constraints are enabled.

As one example, a video encoder (e.g., video encoder 20) may be configured to signal a value in a bitstream corresponding to a first syntax element, where the value corresponding to the first syntax element is indicative of whether one or more symmetric MV constraints are enabled. The value may be a true value (e.g., a value of 1) to indicate enablement or a false value (e.g., a value of 0) to indicate disablement, or the value may be a false value (e.g., a value of 0) to indicate enablement or a true value (e.g., a value of 1) to indicate disablement. In some examples, a video encoder (e.g., video encoder 20) may be configured to signal a value corresponding to the first syntax element only when one or more symmetric MV constraints are enabled. In other examples, a video encoder (e.g., video encoder 20) may be configured to signal a value corresponding to the first syntax element only when one or more symmetric MV constraints are disabled.

As another example, a video encoder (e.g., video encoder 20) may be configured to signal a value in a bitstream corresponding to a second syntax element, where the value corresponding to the second syntax element is indicative of whether one or more symmetric MV difference constraints are enabled. The value may be a true value (e.g., a value of 1) to indicate enablement or a false value (e.g., a value of 0) to indicate disablement, or the value may be a false value (e.g., a value of 0) to indicate enablement or a true value (e.g., a value of 1) to indicate disablement. In some examples, a video encoder (e.g., video encoder 20) may be configured to signal a value corresponding to the second syntax element only when one or more symmetric MV difference constraints are enabled. In other examples, a video encoder (e.g., video encoder 20) may be configured to signal a value corresponding to the second syntax element only when one or more symmetric MV difference constraints are disabled.

As another example, a video encoder (e.g., video encoder 20) may be configured to signal a value in a bitstream corresponding to a third syntax element, where the value corresponding to the third syntax element is indicative of whether one or more anti-symmetric MV constraints are enabled. The value may be a true value (e.g., a value of 1) to indicate enablement or a false value (e.g., a value of 0) to indicate disablement, or the value may be a false value (e.g., a value of 0) to indicate enablement or a true value (e.g., a value of 1) to indicate disablement. In some examples, a video encoder (e.g., video encoder 20) may be configured to signal a value corresponding to the third syntax element only when one or more anti-symmetric MV constraints are enabled. In other examples, a video encoder (e.g., video encoder 20) may be configured to signal a value corresponding to the third syntax element only when one or more anti-symmetric MV constraints are disabled.

As another example, a video encoder (e.g., video encoder 20) may be configured to signal a value in a bitstream corresponding to a fourth syntax element, where the value corresponding to the fourth syntax element is indicative of whether one or more anti-symmetric MV difference constraints are enabled. The value may be a true value (e.g., a value of 1) to indicate enablement or a false value (e.g., a value of 0) to indicate disablement, or the value may be a false value (e.g., a value of 0) to indicate enablement or a true value (e.g., a value of 1) to indicate disablement. In some examples, a video encoder (e.g., video encoder 20) may be configured to signal a value corresponding to the fourth syntax element only when one or more anti-symmetric MV difference constraints are enabled. In other examples, a video encoder (e.g., video encoder 20) may be configured to signal a value corresponding to the fourth syntax element only when one or more anti-symmetric MV difference constraints are disabled.

In some examples, a video coder (e.g., video decoder 30) may be configured to receive a bitstream, and determine whether one or more of the MV and/or MV difference constraints described herein are enabled based on one or more values present in the bitstream corresponding to one or more syntax elements (e.g., one or more of the first, second, third, and fourth syntax elements described herein).

In other examples, a video coder (e.g., video encoder 20 or video decoder 30) may be configured to determine (e.g., implicitly determine) whether one or more of the MV and/or MV difference constraints described herein are enabled based other coded information.

Several example conditions to adaptively enable one or more constraints described herein (e.g., one or more of symmetric/anti-symmetric MV/MV differences constraints) are listed as below.

1. In some examples, one or more constraints described herein (e.g., one or more symmetric/anti-symmetric MV/MV difference constraints) may only be enabled when the initial MVs are symmetric.
2. In some examples, one or more constraints described herein (e.g., one or more symmetric/anti-symmetric MV/MV difference constraints) may only be enabled when the initial MVs are pseudo symmetric.
3. In some examples, one or more constraints described herein (e.g., one or more symmetric/anti-symmetric MV/MV difference constraints) may only be enabled when the initial MVs are anti-symmetric.
4. In some examples, one or more constraints described herein (e.g., one or more symmetric/anti-symmetric MV/MV difference constraints) may only be enabled when the initial MVs are pseudo anti-symmetric.
5. In some examples, one or more constraints described herein (e.g., one or more symmetric/anti-symmetric MV/MV difference constraints) may only be enabled when the initial MVs are not symmetric.
6. In some examples, one or more constraints described herein (e.g., one or more symmetric/anti-symmetric MV/MV difference constraints) may only be enabled when the initial MVs are not pseudo symmetric.
7. In some examples, one or more constraints described herein (e.g., one or more symmetric/anti-symmetric MV/MV difference constraints) may only be enabled when the initial MVs are not anti-symmetric.
8. In some examples, one or more constraints described herein (e.g., one or more symmetric/anti-symmetric MV/MV difference constraints) may only be enabled when the initial MVs are not pseudo anti-symmetric.
9. In some examples, one or more constraints described herein (e.g., one or more symmetric/anti-symmetric MV/MV difference constraints) may only be enabled when List0 and List1 reference pictures of the initial MVs are both before or both after the current picture.
10. In some examples, one or more constraints described herein (e.g., one or more symmetric/anti-symmetric MV/MV difference constraints) may only be enabled when List0 and List1 reference pictures of the initial MVs are not both before or both after the current picture.
11. In some examples, one or more constraints described herein (e.g., one or more symmetric/anti-symmetric MV/MV difference constraints) may only be enabled when reference index of the initial MVs are both zero.
12. In some examples, one or more constraints described herein (e.g., one or more symmetric/anti-symmetric MV/MV difference constraints) may only be enabled when reference index of the initial MVs are not both zero.
13. In some examples, one or more constraints described herein (e.g., one or more symmetric/anti-symmetric MV/MV difference constraints) may only be enabled when the POC distances between List0 reference picture and current picture and the POC distances between List1 reference picture and current picture are the same.
14. In some examples, one or more constraints described herein (e.g., one or more symmetric/anti-symmetric MV/MV difference constraints) may only be enabled when the POC distances between List0 reference picture and current picture and the POC distances between List1 reference picture and current picture are not the same.
15. In some examples, one or more symmetric MV difference constraints may be applied when the initial MVs are not symmetric,
16. In some examples, one or more anti-symmetric MV difference constraints may be applied when the initial MVs are symmetric,
17. In some examples, the MV resolution of one or more of the symmetric constraints may be assigned in a deterministic fashion. In one example, for integer-pel refinement of Bilateral Template Matching, no symmetric/pseudo-symmetric/asymmetric constraint may be imposed, and the aforementioned constraints are only on half-pel, quarter-pel, or higher-precision motion refinement. The level of constraint (at which MV resolution) may be signalled through SPS/PPS/Slice Header. The resolution may also be decided along with whether other motion-refinement tools such as BIO, sub-pel FRUC are enabled. For example, when BIO is enabled, the constraint may not be imposed on quarter-pel or higher-precision motion refinement.

18. In some examples, the level of constraint (e.g., which constraints are enabled) can be made adaptive according to the absolute difference between List0 and List1 MVs, the scaled (based on their relative POC distance) absolute difference between List0 and List1 MVs, or the initial SAD values between the interpolated samples of List0 and List1 (namely, P0 and P1 in this example). In other examples, the ratio of the sum of absolute difference (SAD) values between (current template, P0) and (current template, P1) can be used to decide at what MV resolution the constraint should be imposed. In this example, if the ratio of the SAD values is lower than a threshold, then no aforementioned symmetric constraints should be imposed.

Table 4 lists examples of applied conditions and constraints based on the foregoing conditions being met.

This example is illustrated as Constraint Example 1 in Table 4, which also includes other examples of different constraints.

TABLE 4

Examples of Conditions and Constraints

| Constraint Examples | Conditions | Applied Constraints |
|---|---|---|
| 1 | Initial MVs are symmetric | No Constraint |
|   | Initial MVs are not symmetric | Pseudo Symmetric MV Difference |
| 2 | Initial MVs are symmetric | No Constraint |
|   | Initial MVs are not symmetric | Symmetric MV difference |
| 3 | Initial MVs are pseudo symmetric | No Constraint |
|   | Initial MVs are not pseudo symmetric | Pseudo Symmetric MV difference |
| 4 | Initial MVs are pseudo symmetric | No Constraint |
|   | Initial MVs are not pseudo symmetric | Symmetric MV difference |
| 5 | Initial MVs are symmetric | Non-Pseudo Symmetric MV Difference |
|   | Initial MVs are not symmetric | Pseudo Symmetric MV Difference |
| 6 | Initial MVs are symmetric | Non-Symmetric MV difference |
|   | Initial MVs are not symmetric | Symmetric MV difference |
| 7 | Initial MVs are pseudo symmetric | Non-Pseudo Symmetric MV difference |
|   | Initial MVs are not pseudo symmetric | Pseudo Symmetric MV difference |
| 8 | Initial MVs are pseudo symmetric | Non-Symmetric MV difference |
|   | Initial MVs are not pseudo symmetric | Symmetric MV difference |

Figure 15:
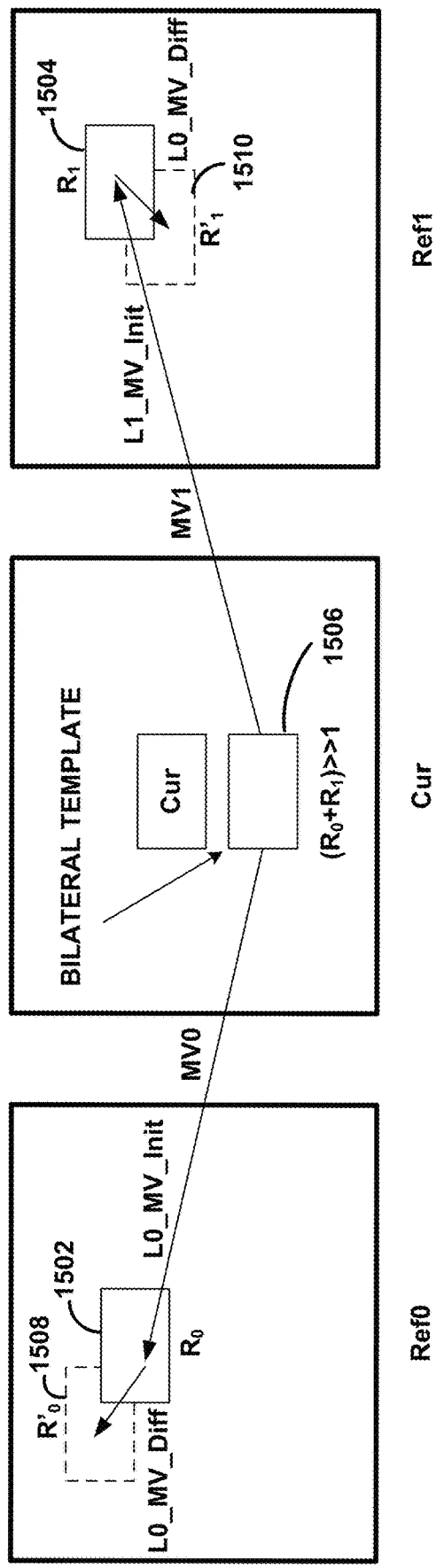
FIG. 15 is a conceptual diagram illustrating concepts related to bilateral matching for deriving motion information of a current block.

FIG. 15 illustrates an exemplary use case of Bilateral Template Matching according to the present disclosure. FIG. 15 illustrates an example where one or more pseudo-symmetric MV difference constraints described herein may be applied to Bilateral Template Matching only when the initial MVs are not symmetric. According to such examples, for Bilateral Template Matching, when the initial MVs are not symmetric, the final MVs may be derived such that the MV differences between the initial MVs and the final MVs must be pseudo-symmetric. For example, as shown in FIG. 15, the Bilateral Template 1506 may first be derived using the initial MVs in List0 (L0_MV_Init pointing to block $R_0$ 1502) and List1 (L1_MV_Init pointing to block $R_1$ 1504) (e.g. the MVs of a bi-prediction merging candidate), by averaging $R_0$ and $R_1$, and then the Bilateral Template 1506 may be utilized to search for best matching blocks in List0 and List1 to find a best List0/List1 MVs. The Bilateral Template Matching may be performed within a pre-defined search range (e.g. −1 to +1 integer pixel) centered at the initial MVs in List0/List1 searching for blocks, e.g., $R'_0$ 1508 and $R'_1$ 1510. The difference between the initial blocks (block $R_0$ 1502 and block $R_1$ 1504) and the searched blocks ($R'_0$ 1508 and $R'_1$ 1510) is shown by the respective MV difference (denoted L0_MV_Diff and L1_MV_Diff). In some examples, only the MV pairs which have pseudo-symmetric MV difference (comparing L0_MV_Diff and L1_MV_Diff) in List0 and List1 may be regarded as valid MVs. The valid MV pair with best matching cost may then be regarded as the final derived MVs by Bilateral Template Matching. The illustrated example is denoted as constrain example 1 in Table 4, shown above.

Figure 16:
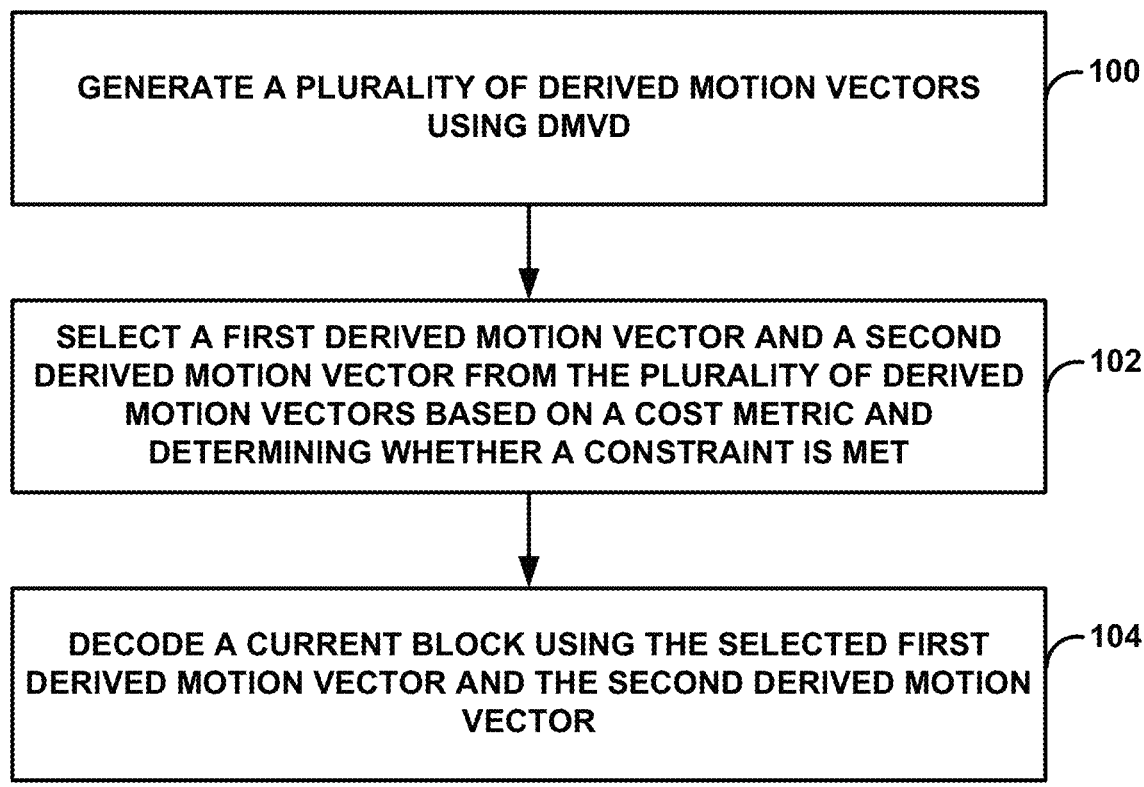
FIG. 16 is a flowchart illustrating an example method of decoding video data in accordance with techniques described in this disclosure.

FIG. 16 is a flowchart illustrating an example method according to the techniques of this disclosure. The techniques of FIG. 16 may be implemented by one or more of a destination device 14 or video decoder 30 (see FIGS. 1 and 3).

In one example of the disclosure, video decoder 30 may be configured to generate, using decoder-side motion vector derivation (DMVD), a plurality of derived motion vectors (100). In some examples, using DMVD to generate the plurality of derived motion vectors comprises using one of a BIO process, a FRUC process, a Bilateral Matching process, a FRUC template matching process, or a bilateral template matching process. In some examples, video decoder 30 may generate the plurality of derived motion vectors based on a determination of whether first and second initial motion vectors meet one or more conditions. Video decoder 30 may be configured to determine a first derived motion vector and a second derived motion vector from the plurality of derived motion vectors based on a cost metric and determining whether a constraint is met (102). In an example, the cost metric includes a sum of absolute differences. The constraint may include whether the first derived motion vector and the second derived motion vector have a symmetric motion vector difference, have a pseudo symmetric motion vector difference, are anti-symmetric, have an anti-symmetric motion vector difference, or have a pseudo anti-symmetric motion vector difference. Video decoder 30 may be configured to determine whether the first derived motion vector and the second derived motion vector have a symmetric motion vector difference, have a pseudo symmetric motion vector difference, are anti-symmetric, have an anti-symmetric motion vector difference, or have a pseudo anti-symmetric motion vector difference. The constraint may be signaled via the bitstream, may be derived, or preprogrammed.

In an example, video decoder 30 may be configured to determine that the first derived motion vector and the second derived motion vector have the symmetric motion vector difference comprises determining that: L0_MV_X_Diff*(CURR_POC−L1_POC_Derived)=L1_MV_X_Diff*(CURR_POC−L0_POC_Derived) or L0_MV_Y_Diff*(CURR_POC−L1_POC_Derived)=L1_MV_Y_Diff*(CURR_POC−L0_POC_Derived), wherein: L0_MV_X_Diff is an X component of a difference between a first initial motion vector and the first derived motion vector, L0_MV_Y_Diff is a Y component of a difference between the first initial motion vector and the first derived motion vector, L1_MV_X_Diff is an X component of a difference between a second initial motion vector and the second derived motion vector, L1_MV_Y_Diff is a Y component of a difference between the second initial motion vector and the second derived motion vector, CURR_POC is a current POC of a current picture, L0_POC_Derived is a derived POC for a first list of motion vectors, and L1_POC_Derived is a derived POC for a second list of motion vectors.

In another example, video decoder 30 may be configured to determine that the first derived motion vector and the second derived motion vector have the anti-symmetric motion vector difference comprises determining that: L0_MV_X_Diff*(CURR_POC−L1_POC_Derived)=−1*L1_MV_X_Diff*(CURR_POC−L0_POC_Derived), or L0_MV_Y_Diff*(CURR_POC−L1_POC_Derived)=−1*L1_MV_Y_Diff*(CURR_POC−L0_POC_Derived) wherein: L0_MV_X_Diff is an X component of a difference between a first initial motion vector and the first derived motion vector, L0_MV_Y_Diff is a Y component of a difference between the first initial motion vector and the first derived motion vector, L1_MV_X_Diff is an X component of a difference between a second initial motion vector and the second derived motion vector, L1_MV_Y_Diff is a Y component of a difference between the second initial motion vector and the second derived motion vector, CURR_POC is a current POC of a current picture, L0_POC_Derived is a derived POC for a first list of motion vectors, and L1_POC_Derived is a derived POC for a second list of motion vectors.

In another example, video decoder 30 may be configured to determine that the first derived motion vector and the second derived motion vector are anti-symmetric comprises determining that: L0_MV_X_Derived*(CURR_POC−L1_POC_Derived)=−1*L1_MV_X_Derived*(CURR_POC−L0_POC_Derived), or L0_MV_Y_Derived*(CURR_POC−L1_POC_Derived)=−1*L1_MV_Y_Derived*(CURR_POC−L0_POC_Derived), wherein: L0_MV_X_Derived is an X component of the first derived motion vector, L0_MV_Y_Derived is a Y component of the first derived motion vector, L1_MV_X_Derived is an X component of the second derived motion vector, L1_MV_Y_Derived is a Y component of the second derived motion vector, CURR_POC is a current POC of a current picture, L0_POC_Derived is a derived POC for a first list of motion vectors, and L1_POC_Derived is a derived POC for a second list of motion vectors.

In another example, video decoder 30 may be configured to determine that the first derived motion vector and the second derived motion vector have the pseudo symmetric motion vector difference comprises determining that: L0_MV_X_Diff=L1_MV_X_Diff, L0_MV_Y_Diff=L1_MV_Y_Diff, L0_MV_X_Diff=−1*L1_MV_X_Diff, or L0_MV_Y_Diff=−1*L1_MV_Y_Diff; wherein: L0_MV_X_Diff is an X component of a difference between a first initial motion vector and the first derived motion vector, L0_MV_Y_Diff is a Y component of a difference between the first initial motion vector and the first derived motion vector, L1_MV_X_Diff is an X component of a difference between a second initial motion vector and the second derived motion vector, and L1_MV_Y_Diff is a Y component of a difference between the second initial motion vector and the second derived motion vector.

In another example, video decoder 30 may be configured to determine that the first derived motion vector and the second derived motion vector have the pseudo anti-symmetric motion vector difference comprises a determination that: L0_MV_X_Diff=L1_MV_X_Diff, L0_MV_Y_Diff=L1_MV_Y_Diff, L0_MV_X_Diff=−1*L1_MV_X_Diff, or L0_MV_Y_Diff=−1*L1_MV_Y_Diff; wherein: L0_MV_X_Diff is an X component of a difference between a first initial motion vector and the first derived motion vector, L0_MV_Y_Diff is a Y component of a difference between the first initial motion vector and the first derived motion vector, L1_MV_X_Diff is an X component of a difference between a second initial motion vector and the second derived motion vector, and L1_MV_Y_Diff is a Y component of a difference between the second initial motion vector and the second derived motion vector.

In another example, video decoder 30 may be configured to determine that a first initial motion vector in a motion vector candidate list and a second initial motion vector in the motion vector candidate list satisfy at least one condition on a relationship between the first initial motion vector and the second initial motion vector, the relationship comprising: the first initial motion vector and the second initial motion vector are symmetric, the first initial motion vector and the second initial motion vector are pseudo symmetric, the first initial motion vector and the second initial motion vector have the symmetric motion vector difference, the first initial motion vector and the second initial motion vector are anti-symmetric, are the first initial motion vector and the second initial motion vector pseudo anti-symmetric, or the first initial motion vector and the second initial motion vector have the anti-symmetric motion vector difference, wherein generating the plurality of derived motion vectors is based on the first initial motion vector and the second initial motion satisfying the at least one condition.

In another example, video decoder 30 may be configured to determine whether a first initial motion vector in a motion vector candidate list and a second initial motion vector in the motion vector candidate list are before a current picture or are after the current picture, wherein determining the first derived motion vector and the second derived motion vector from the plurality of derived motion vectors based on the cost metric is further based on the determination.

In another example, video decoder 30 may be configured to determine whether a first picture order count (POC) distance between a first reference picture associated with a first motion vector candidate list and a current picture is zero and a second POC distance between a second reference picture associated with a second motion vector candidate list and the current picture is zero, wherein determining the first derived motion vector and the second derived motion vector from the plurality of derived motion vectors based on the cost metric is further based on the determination.

In another example, video decoder 30 may be configured to determine whether a first picture order count (POC) distance between a first reference picture associated with a first motion vector candidate list and a current picture is zero and a second POC distance between a second reference picture associated with a second motion vector candidate list and the current picture is zero, wherein determining the first derived motion vector and the second derived motion vector from the plurality of derived motion vectors based on the cost metric generating the plurality of derived motion vectors is further based on the determining the first POC distance between the first reference picture associated with the first motion vector candidate list and the current picture is zero and the second POC distance between the second reference picture associated with the second motion vector candidate list and the current picture is zero determination.

In another example, video decoder 30 may be configured to determine the at least one constraint from the encoded video bitstream.

Video decoder 30 may be configured to decode a current block using the determined first derived motion vector and the second derived motion vector (104).

Figure 17:
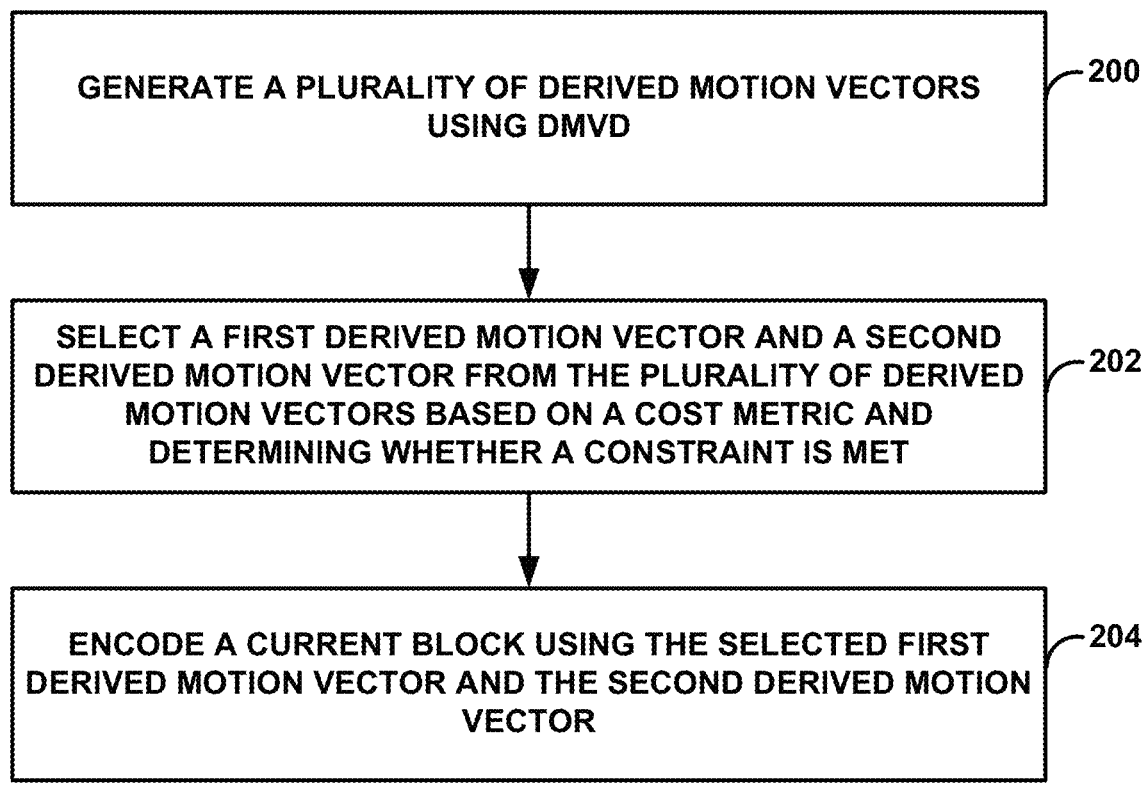
FIG. 17 is a flowchart illustrating an example method of encoding video data in accordance with techniques described in this disclosure.

FIG. 17 is a flowchart illustrating an example method according to the techniques of this disclosure. The techniques of FIG. 17 may be implemented by one or more of a source device 12 or video encoder 20 (see FIGS. 1 and 2).

Video encoder 20 may be configured to generate a plurality of derived motion vectors using DMVD (200). In some examples, video encoder 20 may generate the plurality of derived motion vectors based on a determination of whether first and second initial motion vectors meet one or more conditions.

Video encoder 20 may be configured to determine a first derived motion vector and a second derived motion vector from the plurality of derived motion vectors based on a cost metric and determining whether a constraint is met (202). The constraint may include whether the first derived motion vector and the second derived motion vector have a symmetric motion vector difference, have a pseudo symmetric motion vector difference, are anti-symmetric, have an anti-symmetric motion vector difference, or have a pseudo anti-symmetric motion vector difference. Video encoder 20 may be configured to encode a current block using the determined first derived motion vector and the second derived motion vector (204). Video encoder 20 may be configured to code the constraint. Video encoder 20 may be further configured to send the constraint via a bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, processing circuitry (including fixed function circuitry and/or programmable processing circuitry), application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data from an encoded video bitstream, the method comprising:
generating, using decoder-side motion vector derivation (DMVD), a plurality of derived motion vectors;
determining a first derived motion vector and a second derived motion vector from the plurality of derived motion vectors based on a cost metric, comprising:
determining that the first derived motion vector and the second derived motion vector satisfy at least one constraint on a relationship between the first derived motion vector and the second derived motion vector, the relationship comprising: the first derived motion vector and the second derived motion vector have a symmetric motion vector difference,
wherein determining that the first derived motion vector and the second derived motion vector have the symmetric motion vector difference comprises determining that:
L0_MV_X_Diff*(CURR_POC−L1_POC_Derived)=L1_MV_X_Diff*(CURR_POC−L0_POC_Derived) or
L0_MV_Y_Diff*(CURR_POC−L1_POC_Derived)=L1_MV_Y_Diff*(CURR_POC−L0_POC_Derived),
wherein:
L0_MV_X_Diff is an X component of a difference between a first initial motion vector and the first derived motion vector,
L0_MV_Y_Diff is a Y component of a difference between the first initial motion vector and the first derived motion vector,
L1_MV_X_Diff is an X component of a difference between a second initial motion vector and the second derived motion vector,
L1_MV_Y_Diff is a Y component of a difference between the second initial motion vector and the second derived motion vector,
CURR_POC is a current picture order count (POC) of a current picture,
L0_POC_Derived is a derived POC for a first list of motion vectors, and
L1_POC_Derived is a derived POC for a second list of motion vectors;
and
decoding a current block using the determined first derived motion vector and the second derived motion vector using bi-prediction.

2. The method of claim 1, wherein using DMVD to generate the plurality of derived motion vectors comprises using one of a Bi-directional Optical flow (BIO) process, a frame-rate up-conversion (FRUC) process, a Bilateral Matching process, a FRUC template matching process, or a bilateral template matching process.

3. The method of claim 1, further comprising:
determining whether a first initial motion vector in a motion vector candidate list and a second initial motion vector in the motion vector candidate list are before a current picture or are after the current picture,
wherein determining the first derived motion vector and the second derived motion vector from the plurality of derived motion vectors based on the cost metric is further based on the determination.

4. The method of claim 1, further comprising:
determining whether a first picture order count (POC) distance between a first reference picture associated with a first motion vector candidate list and a current picture is zero and a second POC distance between a second reference picture associated with a second motion vector candidate list and the current picture is zero,
wherein determining the first derived motion vector and the second derived motion vector from the plurality of derived motion vectors based on the cost metric is further based on the determination.

5. The method of claim 1, further comprising:
determining whether a first picture order count (POC) distance between a first reference picture associated with a first motion vector candidate list and a current picture is zero and a second POC distance between a second reference picture associated with a second motion vector candidate list and the current picture is zero,
wherein determining the first derived motion vector and the second derived motion vector from the plurality of derived motion vectors based on the cost metric is further based on the determination.

6. The method of claim 1, further comprising:
determining the at least one constraint from the encoded video bitstream.

7. The method of claim 1, wherein the cost metric includes a sum of absolute differences.

8. An apparatus configured to decode video data from an encoded video bitstream, the apparatus comprising:
a memory configured to store the video data; and
one or more processors in communication with the memory, the one or more processors configured to:
generate, using decoder-side motion vector derivation (DMVD), a plurality of derived motion vectors;
determine a first derived motion vector and a second derived motion vector from the plurality of derived motion vectors based on a cost metric, comprising:
a determination that the first derived motion vector and the second derived motion vector satisfy at least one constraint on a relationship between the first derived motion vector and the second derived motion vector, the relationship comprising: the first derived motion vector and the second derived motion vector have a symmetric motion vector difference,
wherein the determination that the first derived motion vector and the second derived motion vector have the symmetric motion vector difference comprises a determination that:
L0_MV_X_Diff*(CURR_POC−L1_POC_Derived)=L1_MV_X_Diff*(CURR_POC−L0_POC_Derived) or
L0_MV_Y_Diff*(CURR_POC−L1_POC_Derived)=L1_MV_Y_Diff*(CURR_POC−L0_POC_Derived),
wherein:
L0_MV_X_Diff is an X component of a difference between a first initial motion vector and the first derived motion vector,
L0_MV_Y_Diff is a Y component of a difference between the first initial motion vector and the first derived motion vector,
L1_MV_X_Diff is an X component of a difference between a second initial motion vector and the second derived motion vector,
L1_MV_Y_Diff is a Y component of a difference between the second initial motion vector and the second derived motion vector, CURR_POC is a current picture order count (POC) of a current picture,
L0_POC_Derived is a derived POC for a first list of motion vectors, and
L1_POC_Derived is a derived POC for a second list of motion vectors; and
decode a current block using the determined first derived motion vector and the second derived motion vector using bi-prediction.

9. The apparatus of claim 8, wherein using DMVD to generate the plurality of derived motion vectors comprises using one of a Bi-directional Optical flow (BIO) process, a frame-rate up-conversion (FRUC) process, a Bilateral Matching process, a FRUC template matching process, or a bilateral template matching process.

10. The apparatus of claim 8, wherein the one or more processors are further configured to:
determine whether a first initial motion vector in a motion vector candidate list and a second initial motion vector in the motion vector candidate list are before a current picture or are after the current picture,
wherein determining the first derived motion vector and the second derived motion vector from the plurality of derived motion vectors based on the cost metric is further based on the determination.

11. The apparatus of claim 8, wherein the one or more processors are further configured to:
determine whether a first picture order count (POC) distance between a first reference picture associated with a first motion vector candidate list and a current picture is zero and a second POC distance between a second reference picture associated with a second motion vector candidate list and the current picture is zero,
wherein determining the first derived motion vector and the second derived motion vector from the plurality of derived motion vectors based on the cost metric is further based on the determination.

12. The apparatus of claim 8, wherein the one or more processors are further configured to:
determine whether a first picture order count (POC) distance between a first reference picture associated with a first motion vector candidate list and a current picture is zero and a second POC distance between a second reference picture associated with a second motion vector candidate list and the current picture is zero, wherein determining the first derived motion vector and the second derived motion vector from the plurality of derived motion vectors based on the cost metric generating the plurality of derived motion vectors is further based on the determining the first POC distance between the first reference picture associated with the first motion vector candidate list and the current picture is zero and the second POC distance between the second reference picture associated with the second motion vector candidate list and the current picture is zero determination.

13. The apparatus of claim 8, wherein the one or more processors are further configured to determine the at least one constraint from the encoded video bitstream.

14. The apparatus of claim 8, wherein the cost metric includes a sum of absolute differences.

15. An apparatus configured to decode video data from an encoded video bitstream, the apparatus comprising:
means for generating, using decoder-side motion vector derivation (DMVD), a plurality of derived motion vectors;
means for determining a first derived motion vector and a second derived motion vector from the plurality of derived motion vectors based on a cost metric, comprising:
means for determining that the first derived motion vector and the second derived motion vector satisfy at least one constraint on a relationship between the first derived motion vector and the second derived motion vector, the relationship comprising: the first derived motion vector and the second derived motion vector have a symmetric motion vector difference,
wherein the means for determining that the first derived motion vector and the second derived motion vector have the symmetric motion vector difference comprises means for determining that:
L0_MV_X_Diff*(CURR_POC−L1_POC_Derived)=L1_MV_X_Diff*(CURR_POC−L0_POC_Derived) or
L0_MV_Y_Diff*(CURR_POC−L1_POC_Derived)=L1_MV_Y_Diff*(CURR_POC−L0_POC_Derived),
wherein:
L0_MV_X_Diff is an X component of a difference between a first initial motion vector and the first derived motion vector,
L0_MV_Y_Diff is a Y component of a difference between the first initial motion vector and the first derived motion vector,
L1_MV_X_Diff is an X component of a difference between a second initial motion vector and the second derived motion vector,
L1_MV_Y_Diff is a Y component of a difference between the second initial motion vector and the second derived motion vector,
CURR_POC is a current picture order count (POC) of a current picture,
L0_POC_Derived is a derived POC for a first list of motion vectors, and
L1_POC_Derived is a derived POC for a second list of motion vectors;
and
means for decoding a current block using the determined first derived motion vector and the second derived motion vector using bi-prediction.

16. The apparatus of claim 15, wherein using DMVD to generate the plurality of derived motion vectors comprises using one of a Bi-directional Optical flow (BIO) process, a frame-rate up-conversion (FRUC) process, a Bilateral Matching process, a FRUC template matching process, or a bilateral template matching process.

17. An apparatus configured to encode video data, the apparatus comprising:
a memory configured to store the video data; and
one or more processors in communication with the memory, the one or more processors configured to:
generate, using decoder-side motion vector derivation (DMVD), a plurality of derived motion vectors;
determine a first derived motion vector and a second derived motion vector from the plurality of derived motion vectors based on a cost metric, comprising:
a determination that the first derived motion vector and the second derived motion vector satisfy at least one constraint on a relationship between the first derived motion vector and the second derived motion vector, the relationship comprising: the first derived motion vector and the second derived motion vector have a symmetric motion vector difference, wherein the determination that the first derived motion vector and the second derived motion vector have the symmetric motion vector difference comprises a determination that:

L0_MV_X_Diff*(CURR_POC−L1_POC_Derived)=L1_MV_X_Diff*(CURR_POC−L0_POC_Derived) or L0_MV_Y_Diff*(CURR_POC−L1_POC_Derived)=L1_MV_Y_Diff*(CURR_POC−L0_POC_Derived), wherein:
- L0_MV_X_Diff is an X component of a difference between a first initial motion vector and the first derived motion vector,
- L0_MV_Y_Diff is a Y component of a difference between the first initial motion vector and the first derived motion vector,
- L1_MV_X_Diff is an X component of a difference between a second initial motion vector and the second derived motion vector,
- L1_MV_Y_Diff is a Y component of a difference between the second initial motion vector and the second derived motion vector,
- CURR_POC is a current picture order count (POC) of a current picture,
- L0_POC_Derived is a derived POC for a first list of motion vectors, and
- L1_POC_Derived is a derived POC for a second list of motion vectors;

and encode a current block using the determined first derived motion vector and the second derived motion vector using bi-prediction.

18. The apparatus of claim 17, wherein using DMVD to generate the plurality of derived motion vectors comprises using one of a Bi-directional Optical flow (BIO) process, a frame-rate up-conversion (FRUC) process, a Bilateral Matching process, a FRUC template matching process, or a bilateral template matching process.

* * * * *